United States Patent
Adachi et al.

(10) Patent No.: US 8,181,988 B2
(45) Date of Patent: May 22, 2012

(54) AIRBAG APPARATUS

(75) Inventors: Yuichi Adachi, Aichi-ken (JP); Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 436 days.

(21) Appl. No.: 12/458,050

(22) Filed: Jun. 30, 2009

(65) Prior Publication Data
US 2010/0013197 A1   Jan. 21, 2010

(30) Foreign Application Priority Data

Jul. 16, 2008  (JP) ................................. 2008-185408

(51) Int. Cl.
*B60R 21/233* (2006.01)
*B60R 21/2338* (2006.01)
*B60R 21/2346* (2006.01)

(52) U.S. Cl. ....................... 280/729; 280/740; 280/743.2
(58) Field of Classification Search .................. 280/729, 280/730.1, 731, 732, 735, 740, 743.2
See application file for complete search history.

(56) References Cited

U.S. PATENT DOCUMENTS

| | | | | |
|---|---|---|---|---|
| 5,282,646 A * | 2/1994 | Melvin et al. | ................. | 280/729 |
| 7,059,634 B2 * | 6/2006 | Bossecker et al. | ............ | 280/739 |
| 7,651,130 B2 * | 1/2010 | Bauberger | ................. | 280/743.2 |
| 7,654,568 B2 * | 2/2010 | Yamada | ...................... | 280/743.1 |
| 7,673,899 B2 * | 3/2010 | Abe | .............................. | 280/742 |
| 7,762,576 B2 * | 7/2010 | Cho | ............................. | 280/729 |
| 2007/0205591 A1 * | 9/2007 | Bito | ........................... | 280/743.2 |
| 2007/0228710 A1 * | 10/2007 | Ishiguro et al. | ............ | 280/743.2 |
| 2009/0230663 A1 * | 9/2009 | Mills et al. | .................... | 280/735 |

FOREIGN PATENT DOCUMENTS

JP   A-H11-321506   11/1999

* cited by examiner

*Primary Examiner* — Paul N. Dickson
*Assistant Examiner* — George D. Spisich
(74) *Attorney, Agent, or Firm* — Posz Law Group, PLC

(57) ABSTRACT

An airbag of an airbag apparatus includes a bag body, a supplementary bag, a communication hole that communicates the bag body and the supplementary bag, an open/close element that opens and closes the communication hole and a connecting element extending from the open/close element. The connecting element is connected at the leading end to an anchor mechanism that regulates the operation of the open/close element under control of a control device. The open/close element keeps closing the communication hole while the anchor mechanism holds the connecting element whereas opens the communication hole when the anchor mechanism releases the connecting element such that inflation gas is fed into the supplementary bag.

8 Claims, 17 Drawing Sheets

AIRBAG APPARATUS

The present application claims priority from Japanese Patent Application No. 2008-185408 of Bito et al., filed on Jul. 16, 2008, the disclosure of which is hereby incorporated into the present application by reference.

BACKGROUND OF THE INVENTION

1. Field of the Invention

The present invention relates to an airbag apparatus that includes an airbag inflatable in a suitable inflation mode under control of a control device.

2. Description of Related Art

JP11-321506A discloses an airbag apparatus wherein the contour of the airbag at full inflation is controllable by a control device. This airbag apparatus includes a dual output inflator and an airbag that includes a bag body, an inner bag disposed inside the bag body and a tether that connects the bag body and inner bag while determining a clearance between the inner bag and bag body. The tether is sewn to part of the circumferential wall of the inner bag so as to reduce the volume of the airbag. The inflator includes a first operating section that feeds inflation gas into the bag body and a second operating section that provides inflation gas into the inner bag, and the inflator is configured operable in low-output mode where only the first operating section is actuated and in high-output mode where both the first and second operating sections are actuated, under control of the control device. In low-output mode, the first operating section operates to discharge inflation gas into the bag body only such that the airbag inflates in small-volume mode. In high-output mode the second operating section operates as well to feed inflation gas into the inner bag, and sewing threads that sew together the tether and the circumferential wall of the inner bag rupture due to the pressure of inflation gas flown into the inner bag, such that the tether is lengthened to allow the airbag to inflate in big-volume mode.

However, with the above configuration, there is a possibility that the sewing threads that sew the tether and circumferential wall of the inner bag fail to rupture thoroughly in big-volume mode and the airbag cannot secure a predetermined volume. Moreover, the timing of rupture of the sewing threads is hardly steady. Therefore, there is a room for improvement in inflating the airbag quickly and with a steady contour in big-volume mode.

SUMMARY OF THE INVENTION

The object of the present invention is to provide an airbag apparatus that includes an airbag inflatable quickly into a steady contour in each of inflation modes although controlled by a control device that controls contours of the airbag at full inflation.

The airbag apparatus of the present invention includes a housing, an airbag and an anchor mechanism. The airbag has flexibility and is folded up and housed in the housing for inflation by inflation gas. The airbag includes a bag body, a supplementary bag, a communication hole that communicates the bag body and the supplementary bag, an open/close element that opens and closes the communication hole, and a connecting element extending from the open/close element and having flexibility. The anchor mechanism anchors the leading end of the connecting element in a releasable manner and regulates the operation of the open/close element under control of a control device that determines a desirable inflation mode of the airbag. The open/close element keeps closing the communication hole while the anchor mechanism keeps holding the connecting element and opens the communication hole when the anchor mechanism releases the connecting element, such that inflation gas is fed into the supplementary bag.

With the airbag apparatus thus configured, if the connecting member extending from the open/close element is kept anchored by the anchor mechanism, the airbag inflates with the communication hole closed off by the open/close element, such that the supplementary bag is not fed with inflation gas, i.e. the airbag completes inflation in small-volume mode in which only the bag body inflates. If the connecting element is not anchored by the anchor mechanism, the communication hole is allowed to open up and inflation gas flows into the supplementary bag, i.e. the airbag completes inflation in big-volume mode in which both the bag body and supplementary bag inflate. That is, since the inflation of the supplementary bag is triggered only by disconnection of the connecting element and anchor mechanism, the timing of opening of the communication hole is steady. Furthermore, the opening of the communication hole assures the inflation of entire supplementary bag. Accordingly, the contour of the airbag is steady at full inflation in big-volume mode.

Therefore, in the airbag apparatus of the invention, the airbag is inflatable quickly into a steady contour in each of inflation modes although controlled by a control device that controls contours of the airbag at full inflation.

It will be appreciated in the above airbag to form the open/close element by a flap member comprised of a flexible sheet-like member and sized to close off the communication hole, and joining the flap member to a peripheral area of the communication hole by at least a portion of a circumferential edge of the flap member on an outer circumference of the bag body. In this case, the connecting element is joined to the leading end of the flap member facing away from the portion of the circumferential edge of the flap member joined to the bag body, and is inserted into an interior of the bag body through an insert hole formed on the bag body for connection to the anchor mechanism.

With this configuration, since the open/close element is the flap member comprised of a flexible sheet-like member, the flap member and connecting element are foldable together with the airbag, which is conducible to downsizing and simplification of the airbag apparatus.

Alternatively, the open/close element may be comprised of part of base cloths for forming the bag body. By way of example, two adjoining cloths out of the base cloths each includes an extended portion formed by extending part of a circumferential edge of each of the two adjoining cloths toward an interior of the bag body. These extended portions constitute the open/close element in combination. The two adjoining cloths are coupled together by the circumferential edges but have an uncoupled portion at root regions of the extended portions, and the uncoupled portion forms the communication hole. The connecting elements are connected to leading ends of the extended portions so as to extend across the interior of the bag body to be anchored by the anchor mechanism.

With this configuration, the open/close element and communication hole are formed when sewing circumferential edges of the two adjoining base cloths together except the root regions of the extended portions during the sewing work of the bag body, without a separate work of cutting out a portion of base cloth(s) of the bag body in order to create an opening for the communication hole. Accordingly, the airbag apparatus is comprised of fewer number of parts, and thereby reducing the number of processes and cost required to manufacture an airbag apparatus.

The airbag may have a generally square conical contour at inflation whose front end is the top of the square conical contour such that the airbag apparatus is suitable in use for installation on a top face of an instrument panel in front of a front passenger's seat and the airbag is deployable rearward between the top face of the instrument panel and a windshield. In this case, the airbag further includes: a gas inlet port for introducing inflation gas, at a generally center in a left and right direction of a front end of a lower side of the airbag at full inflation; a recessed area that recesses forward and extends generally vertically at the center in a left and right direction at least on a rear area of the bag body at airbag inflation; and two raised regions located on the left and right of the recessed area and extending generally vertically, the raised regions being raised relative to the recessed area. The supplementary bag is located on the rear area of the bag body so as to fill up the recessed area between the raised regions at opening of the communication hole.

In operation of the above airbag, the airbag inflated in small-volume mode will be preferable for protecting an undersized passenger or a passenger seated proximate the apparatus since only the bag body inflates such that the raised regions and recessed area are formed generally vertically at least on the rear area of the bag body. Specifically, when the bag body inflated in small-volume mode is thrown against such a passenger, which is moving forward, the raised regions firstly receive the vicinities of left and right shoulders of the passenger, thereby reducing forward kinetic energy of the passenger. Thereafter, the head of the passenger enters into the recessed area with the shoulders restrained by the raised regions and then is restrained and suppressed from moving forward. Accordingly, the airbag is capable of receiving the head of the undersized passenger softly while applying as little reaction force as possible since the kinetic energy of the passenger has been reduced by the raised regions. On the contrary, the airbag inflated in big-volume mode will be preferable for protecting a large passenger or a passenger seated away from the apparatus since the bag body and supplementary bag inflate together. Specifically, since the supplementary bag inflates in such a manner as to fill the recessed area between the raised regions, the airbag securely protects even a large passenger or a passenger seated away from the dashboard with sufficient cushioning property, without bottoming out.

It is desired in the airbag apparatus configured as above that the communication hole is formed at the bottom or leading end of the recessed area. With this configuration, the bag body inflates with the leading end of the recessed area connected to the anchor mechanism by the connecting element, in other words with the leading end of the recessed area pulled toward the anchor mechanism when inflating in small-volume mode. Accordingly, the recessed area is formed into a steady recessed contour.

Furthermore, in the above airbag apparatus, it is further desired that the anchor mechanism is located proximate the housing and the connecting element extends generally along the deployment direction of the airbag when the airbag inflates with the connecting element anchored by the anchor mechanism, i.e., in small-volume mode. With this configuration, the connecting element pulls the leading end of the recessed area toward the anchor mechanism in a stable manner at airbag inflation in small-volume mode, such that the contour of the concave of the recessed area is further stabilized and the closure of the communication hole by the open/close element is constantly assured.

BRIEF DESCRIPTIONS OF DRAWINGS

FIG. 1 schematically illustrates an airbag apparatus according to the first embodiment of the present invention, as mounted in front of a front passenger's seat of a vehicle;

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
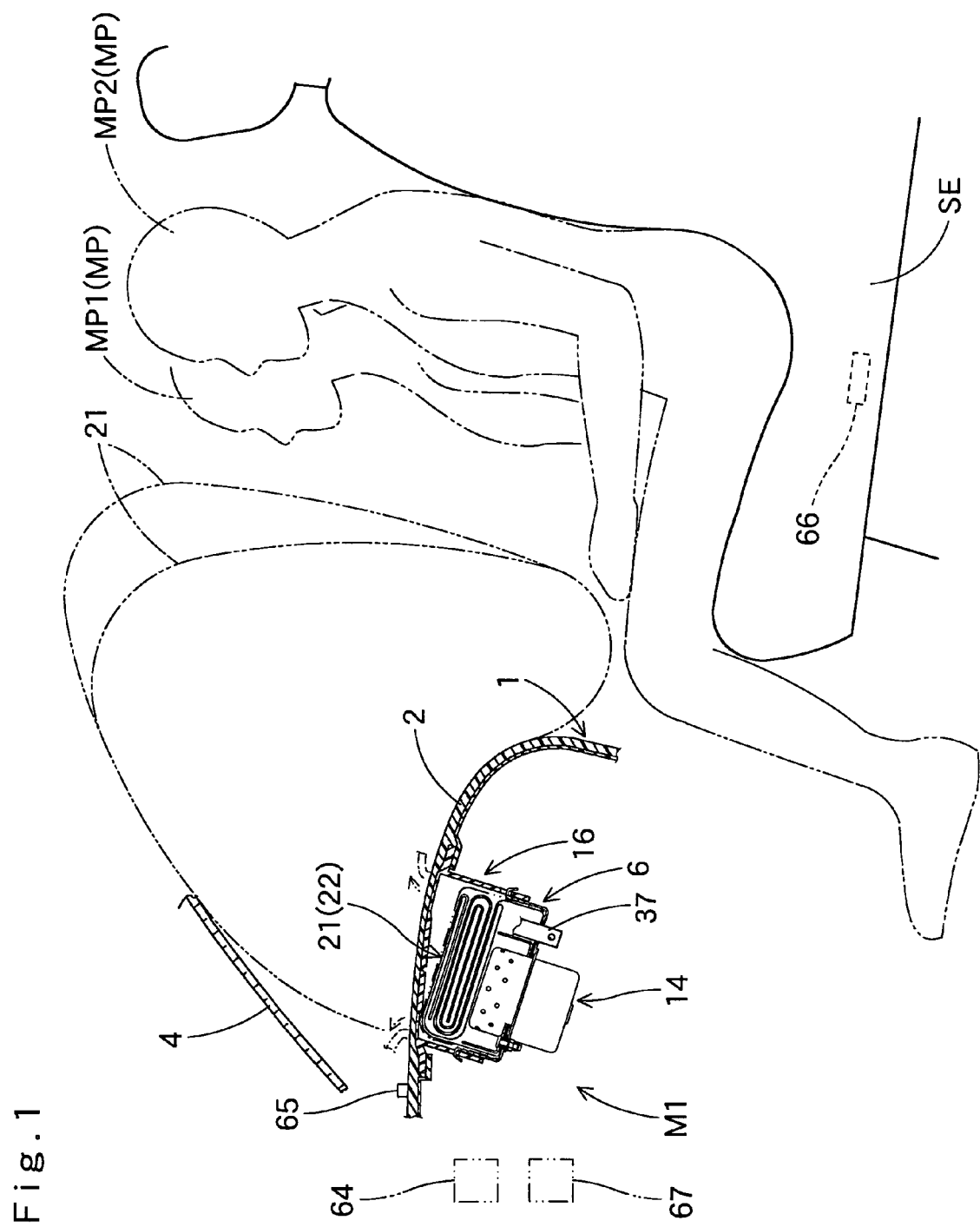
Figure 2:
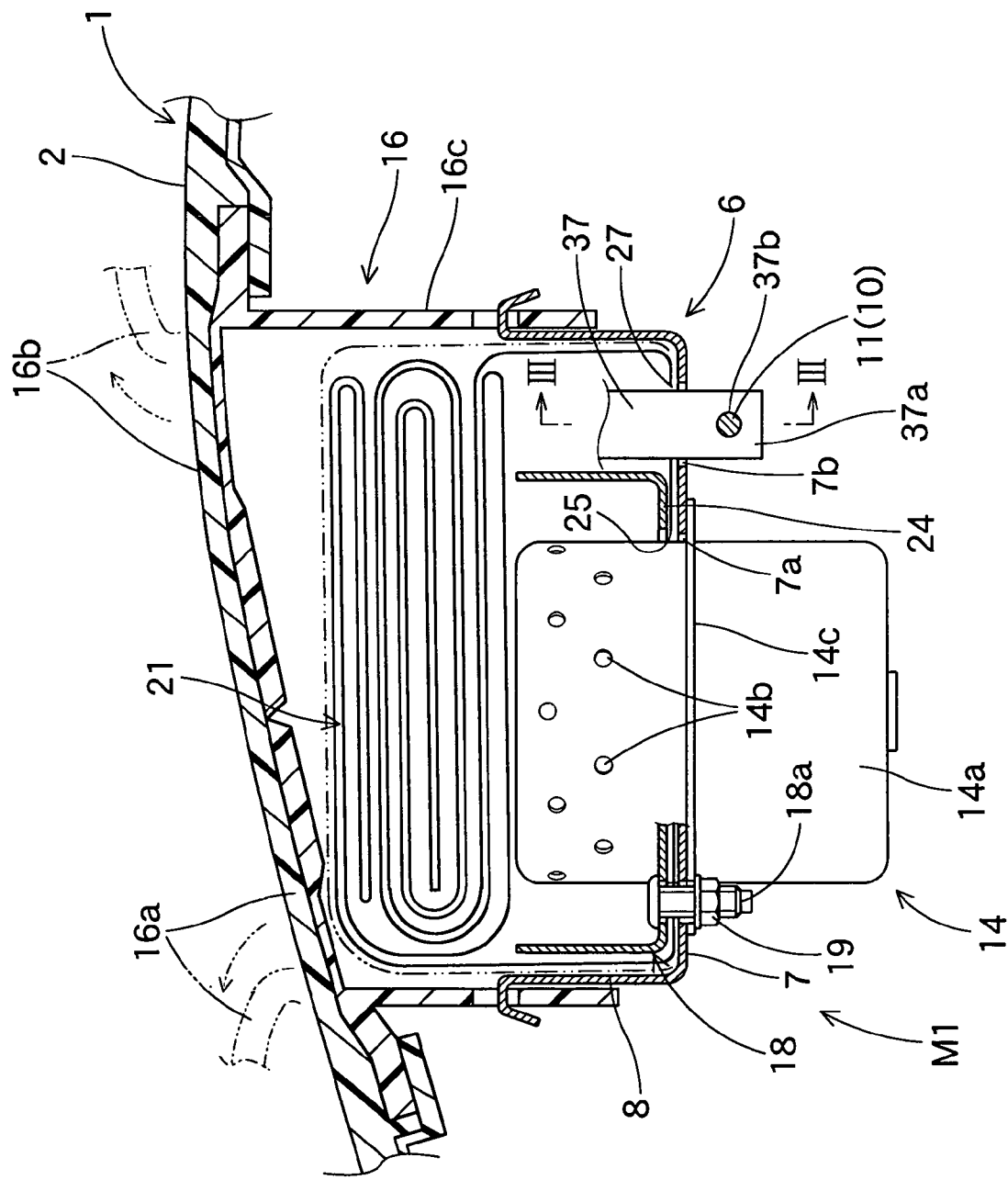
FIG. 2 is a schematic enlarged sectional view of the airbag apparatus of FIG. 1 taken along a longitudinal direction of the vehicle.

FIG. 1 shows an airbag apparatus M1 according to the first embodiment of the present invention, which is an airbag apparatus for a front passenger's seat mounted in front of a front passenger's seat. The airbag apparatus M1 is a top-mount type that is disposed in an interior of the top face 2 of the instrument panel or dashboard 1. As shown in FIGS. 1 and 2, the airbag apparatus M1 includes a folded-up airbag 21, an inflator 14 for supplying the airbag 21 with inflation gas, a case (housing) 6 for housing and holding the airbag 21 and inflator 14, a retainer 18 for attaching the airbag 21 and inflator 14 to the case 6, an open/close element 35 that opens and closes a later-described communication hole 34 formed on the airbag 21, an airbag cover 16 for covering the airbag 21 and an anchor mechanism 10 that controls open/close operation of the open/close element 35. In this embodiment, the activation of the inflator 14 and anchor mechanism 10 is controlled by a control device 64 shown in FIG. 1.

Unless otherwise specified, up/down, front/rear and left/right directions in this specification conform to up/down, front/rear and left/right directions of a vehicle. Especially, up/down, front/rear and left/right directions with respect to the airbag 21 are intended to refer to those at full deployment in mounted state.

As shown in FIG. 1, the control device 64 is electrically communicated with occupant sensors, such as a position sensor 65 for detecting the size of an occupant MP seated in a seat SE and the distance between the dashboard 1 and occupant MP and a weight sensor 66 for detecting the weight of the occupant MP, and a collision sensor 67 for detecting the acceleration of the vehicle and direction of the acceleration. In response to electric signals fed from these sensors, the control device 64 activates the inflator 14 and controls the operation of the anchor mechanism 10 in order for the airbag 21 to deploy in a suitable deployment mode. Specifically, the control device 64 in the present embodiment controls the anchor mechanism 10 such that the airbag 21 is deployable in two modes; big-volume mode and small-volume mode, in accordance with the size and seating position of the occupant MP.

The airbag cover 16 is integral with the dashboard 1 made from synthetic resin and includes two doors, i.e. front and rear doors 16a and 16b adapted to open when pushed by the inflating airbag 21 upon airbag deployment. The airbag cover 16 further includes around the doors 16a and 16b a joint wall 16c coupled to the case 6.

The inflator 14 includes a body portion 14a that is generally columnar in shape and provided with gas discharge ports 14b, and a flange 14c projecting from the outer circumference of the body portion 14a in a generally square plate shape. The body portion 14a is electrically connected with the control device 64 with an unillustrated lead wire.

The case 6 is made of sheet metal into a generally rectangular parallelepiped shape, and has a rectangular opening at the top. The case 6 includes a bottom wall 7 of a generally rectangular plate shape and a circumferential wall 8 extending upward from the outer edge of the bottom wall 7. The inflator 14 is set in an insert hole 7a of the bottom wall 7 from lower side and attached to the bottom wall 7. The circumferential wall 8 retains the joint wall 16c of the airbag cover 16. The case 6 is further provided on the bottom wall 7 with unillustrated brackets for attachment of the case 6 to the vehicle body structure. In the vicinity of and at the rear of the insert hole 7a of the bottom wall 7 is a through hole 7b for receiving a later-described leading end portion 37a of a connecting element 37 extending from the open/close element 35.

Figure 3:
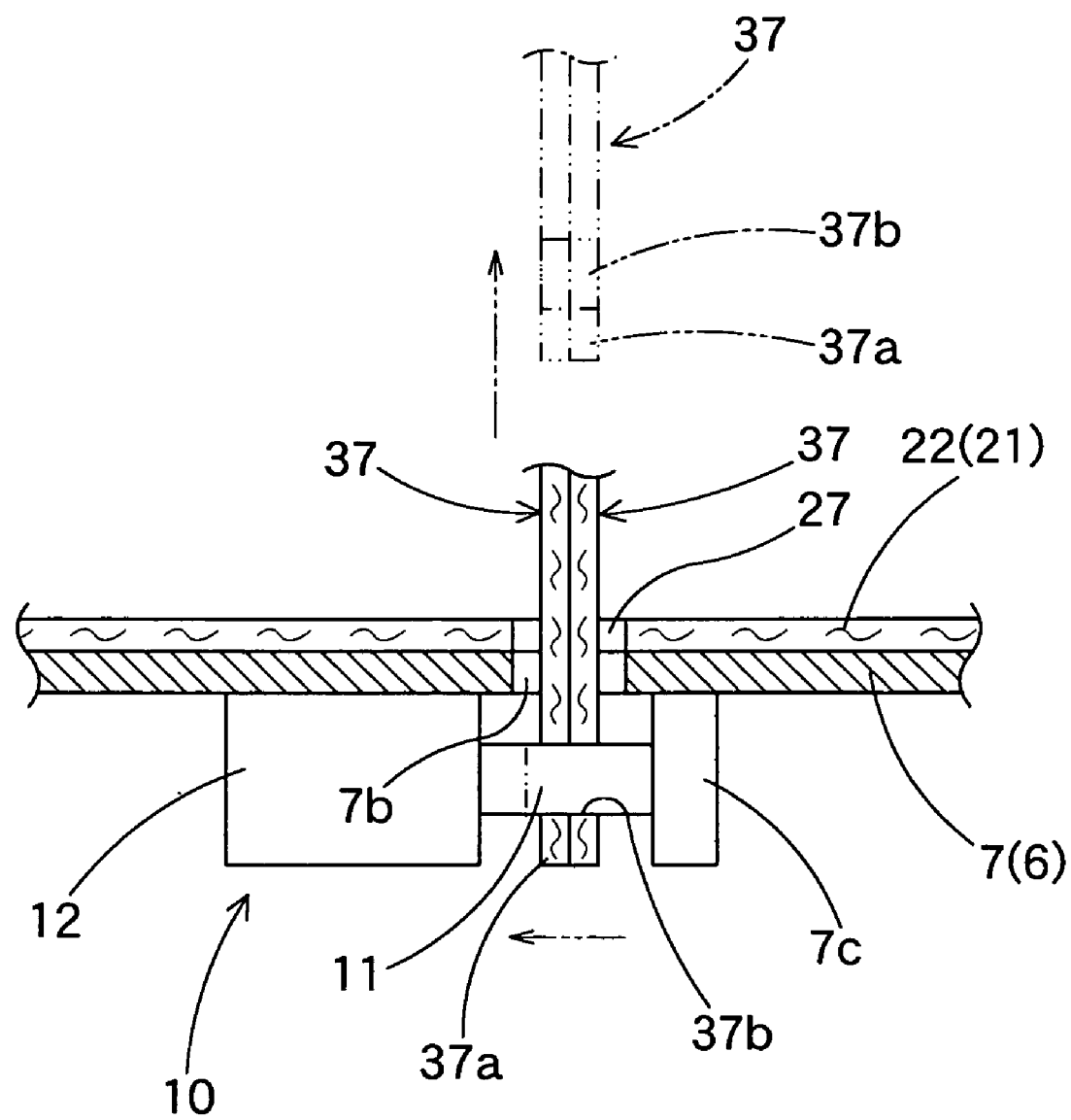
FIG. 3 is a sectional view taken along line III-III of FIG. 2.

As shown in FIG. 3, the anchor mechanism 10 is located in the vicinity of the through hole 7b on the underside of the bottom wall 7. The anchor mechanism 10 anchors the leading end portion 37a of the connecting element 37 extending from the open/close element 35. As shown in FIGS. 2 and 3, the anchor mechanism 10 includes an anchor pin 11 to be put through an insert hole 37b formed at the leading end portion 37a of the connecting element 37 and anchors the leading end portion 37a and an actuator 12 secured to the underside of the bottom wall 7 for retracting the anchor pin 11. If the actuator 12 retracts the pin 11, the anchor pin 11, which had held the leading end portion 37a of the connecting element 37, stops retaining the leading end portion 37a and releases it as indicated by double-dashed lines in FIG. 3. The actuator 12 is electrically connected with the control device 64 with an unillustrated lead wire. The actuator 12 can be any of a piston cylinder utilizing fluid pressure such as hydraulic pressure, water pressure, air pressure, or gas pressure which is generated by inflation gas discharged from the inflator, a motor utilizing such fluid pressure or electricity, an electromagnetic solenoid, a spring which exerts biasing force when restoring, or the like, provided that it can move the anchor pin 11 in response to electric signals fed from the control device 64. In this embodiment, a micro gas generator is used as the actuator 12. As shown in FIG. 3, in the opposite periphery of the through hole 7b with respect to the actuator 12 and on the underside of the bottom wall 7 is a support 7c for supporting the leading end of the anchor pin 11 of the anchor mechanism 10 and keeping the leading end portion 37a retained by the pin 11.

The retainer 18 is annular in shape and includes a plurality of bolts 18a. The retainer 18 is located inside the airbag 21 such that the bolts 18a project through the peripheral area 24 of the inlet opening 25 of the airbag 21, the bottom wall 7 of the case 6 and the flange 14c of the inflator 14. The bolts 18a are then fastened into nuts 19 and thus the airbag 21 and inflator 14 are attached to the case 6.

Referring to FIGS. 4 to 8, the airbag 21 includes a bag body 22 and a supplementary bag 39 communicated with the bag body 22 via a communication hole 34 formed on the bag body 22.

Figure 4:
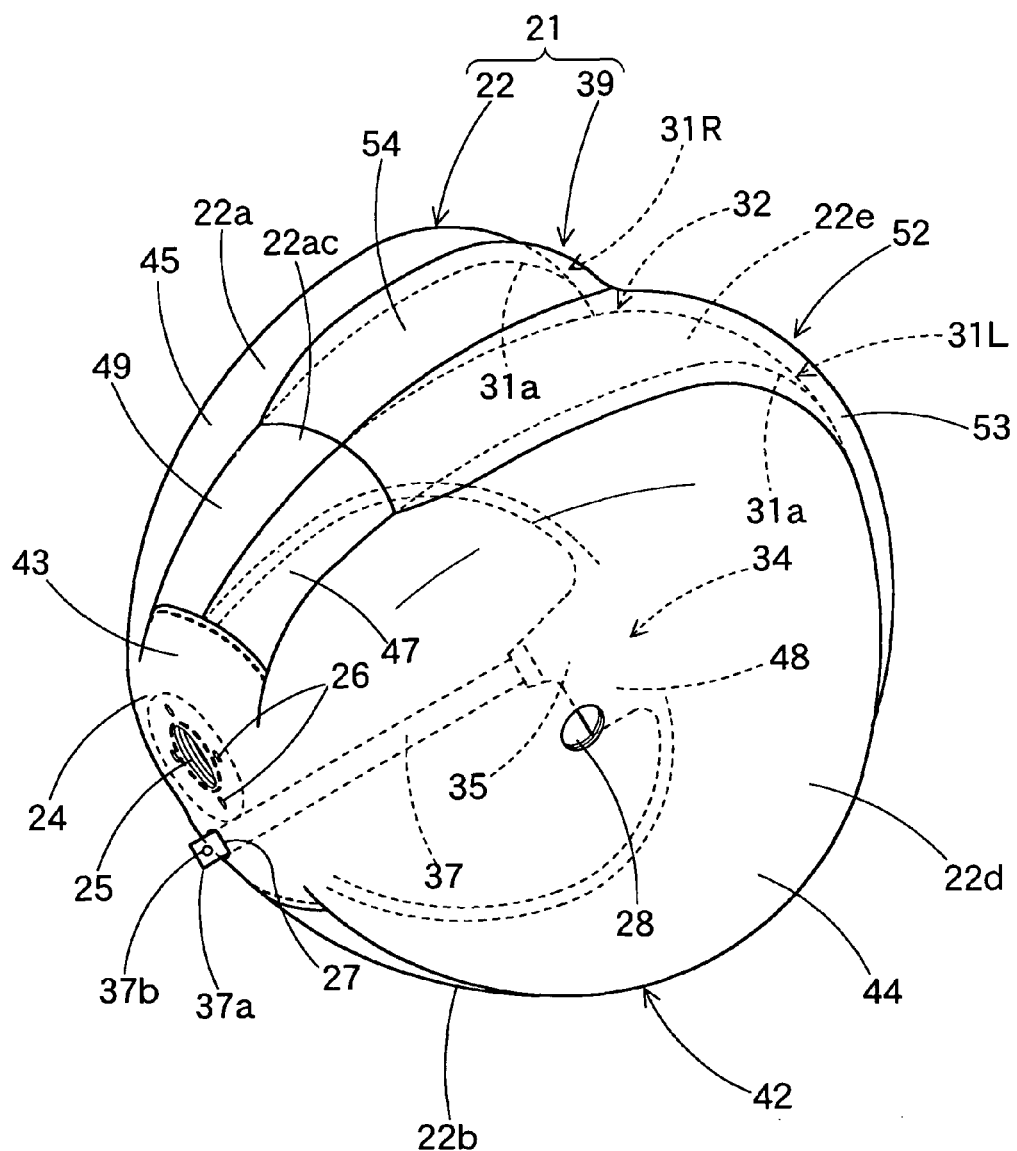
FIG. 4 is a front perspective view of an airbag used in the airbag apparatus of FIG. 1 as inflated by itself in small-volume mode.

The bag body 22 is designed to inflate into a generally square cone whose top is in the front end of the bag body 22. The bag body 22 includes an upper side wall 22a and a lower side wall 22b extending generally along a left and right direction on upper and lower sides, a left side wall 22c and a right side wall 22d extending generally along an anteroposterior direction on left and right sides, and a rear side wall 22e extending generally along a left and right direction in such a manner as to face an occupant and connect the upper side wall 22a and lower side wall 22b. In this embodiment, the rear sidewall 22e serves as an area that receives and protects an occupant MP. The bag body 22 further includes proximate the front end of and at the center in a left and right direction of the lower side wall 22b a round gas inlet port 25 for introducing inflation gas. In the peripheral area 24 of the inlet port 25 are mounting holes 26 for receiving the bolts 18a of the retainer 18. That is, the airbag 21 is mounted on the bottom wall 7 of the case 6 at the peripheral area 24 of the inlet port 25. In the rear periphery of the inlet port 25 and proximate the center in a left and right direction of the bag body 22 is a slit 27 extending in an anteroposterior direction for receiving the leading end portion 37a of the connecting element 37 as shown in FIG. 4. The bag body 22 is further provided respectively on the left side wall 22c and right side wall 22d with a vent hole 28 for releasing extra inflation gas.

Figure 5:
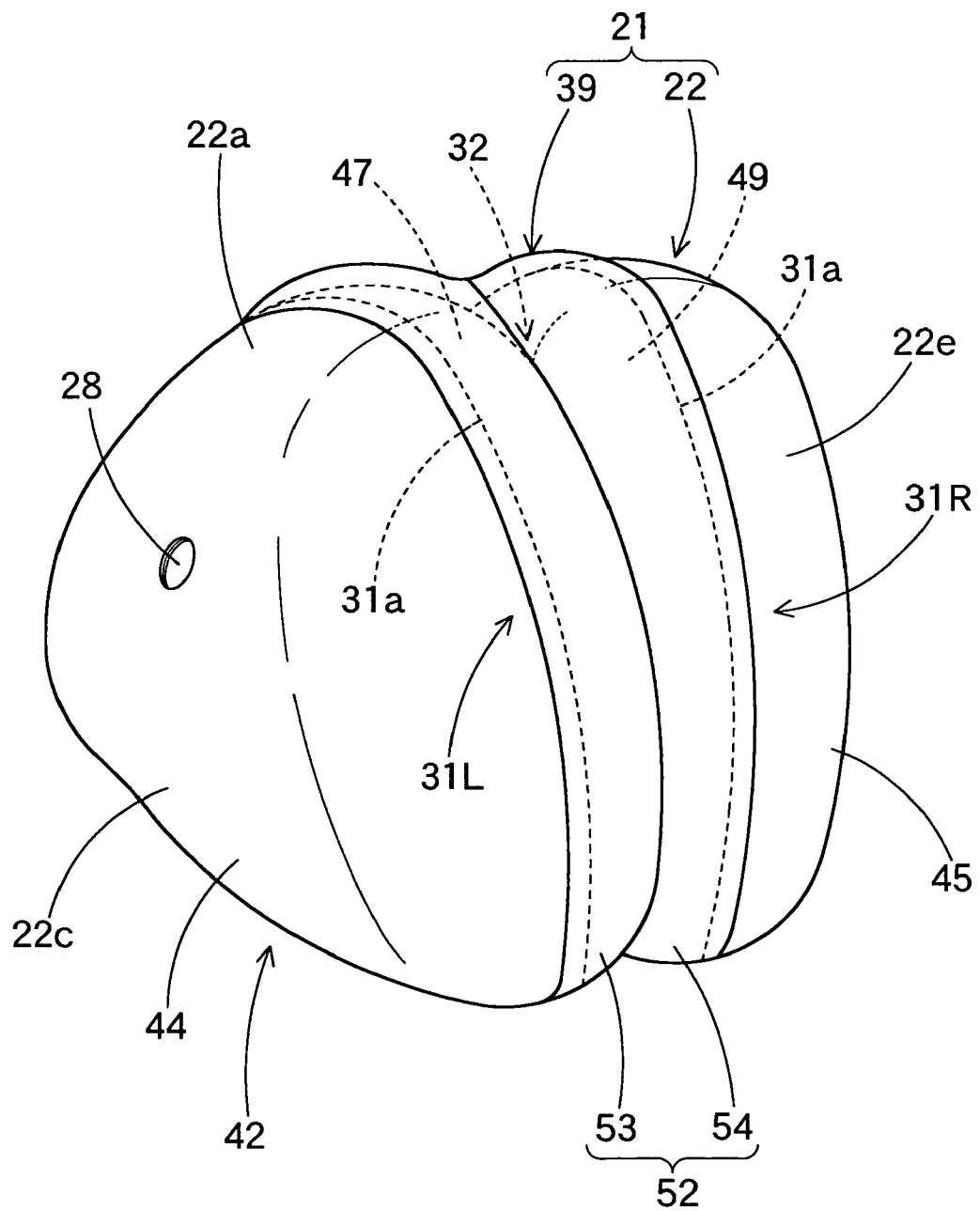
FIG. 5 is a rear perspective view of the airbag of FIG. 4 as inflated by itself in small-volume mode.
Figure 6:
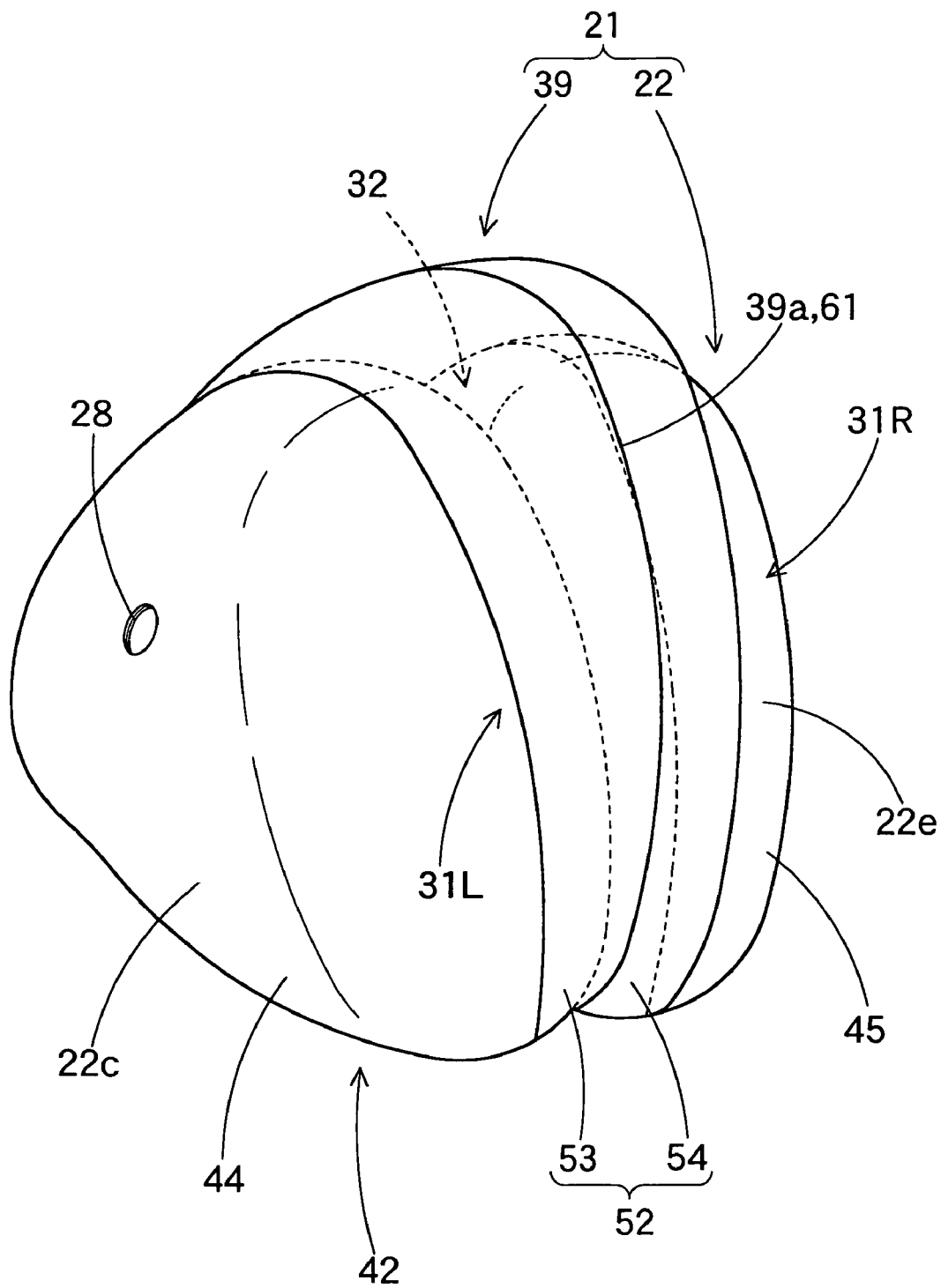
FIG. 6 is a rear perspective view of the airbag of FIG. 4 as inflated by itself in big-volume mode.
Figure 9:
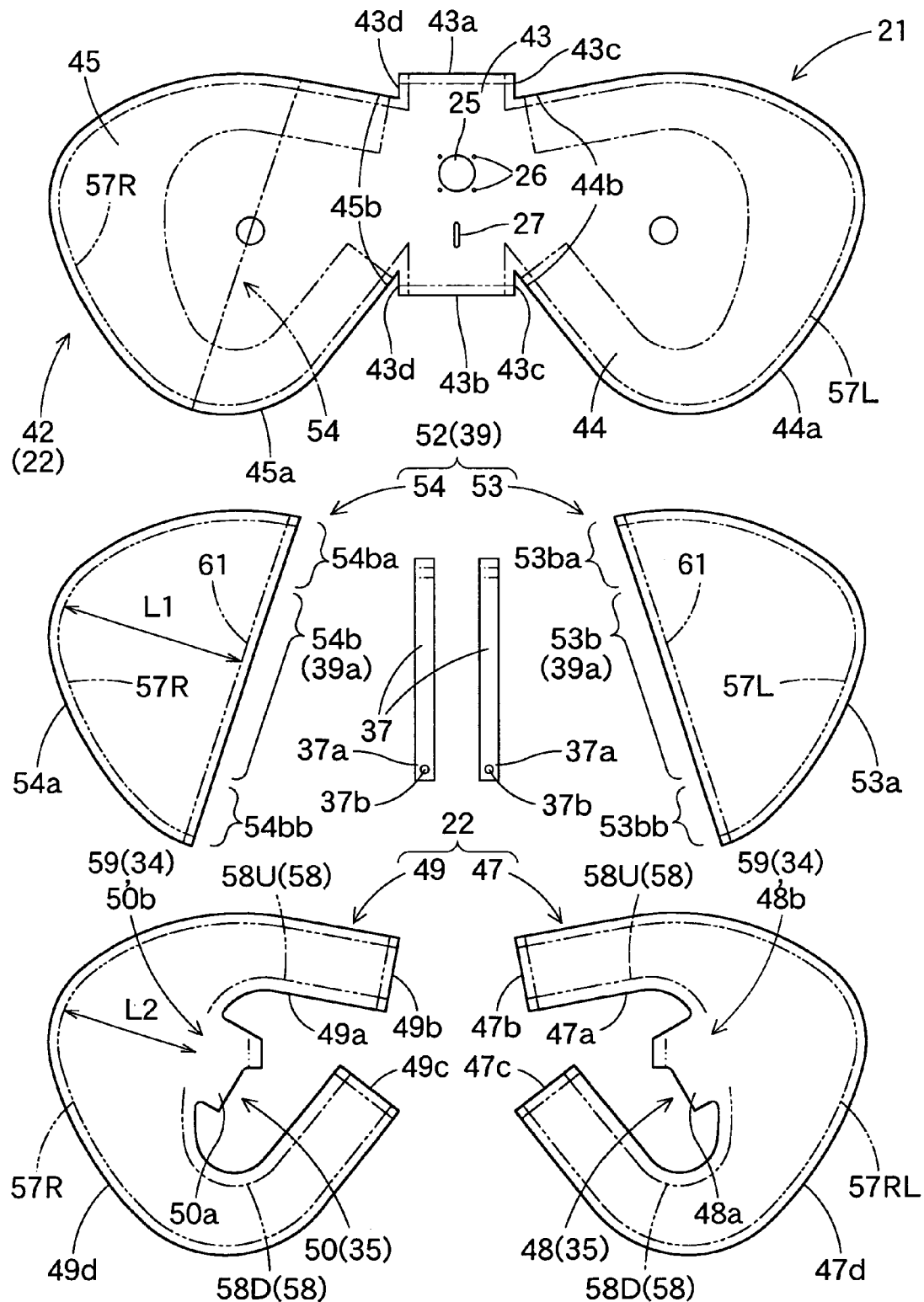
FIG. 9 depicts components of the airbag of FIG. 4 by plan views.
Figure 10:
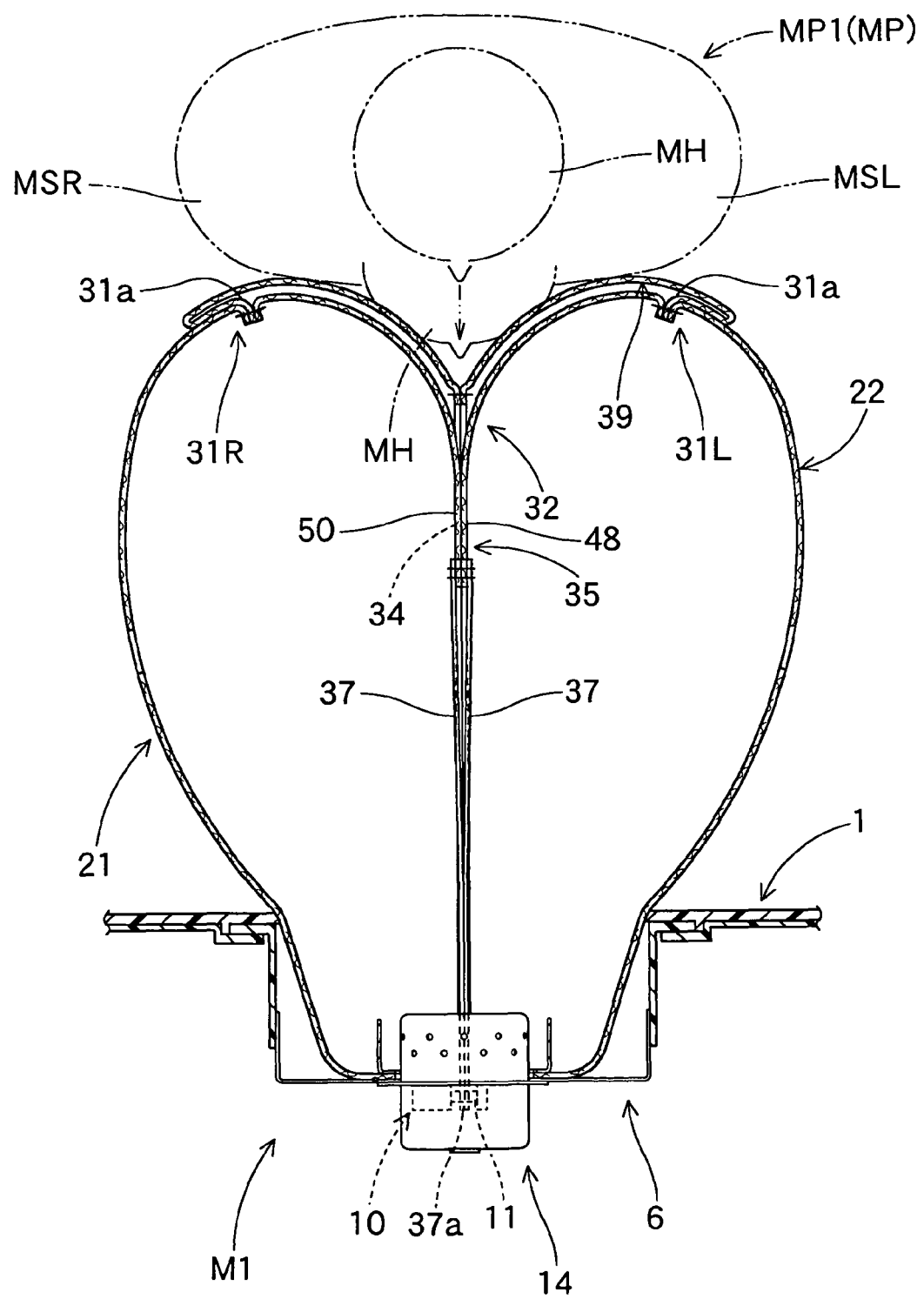
FIG. 10 is a schematic horizontal section of the airbag apparatus of FIG. 1 at full inflation of the airbag in small-volume mode.
Figure 12:
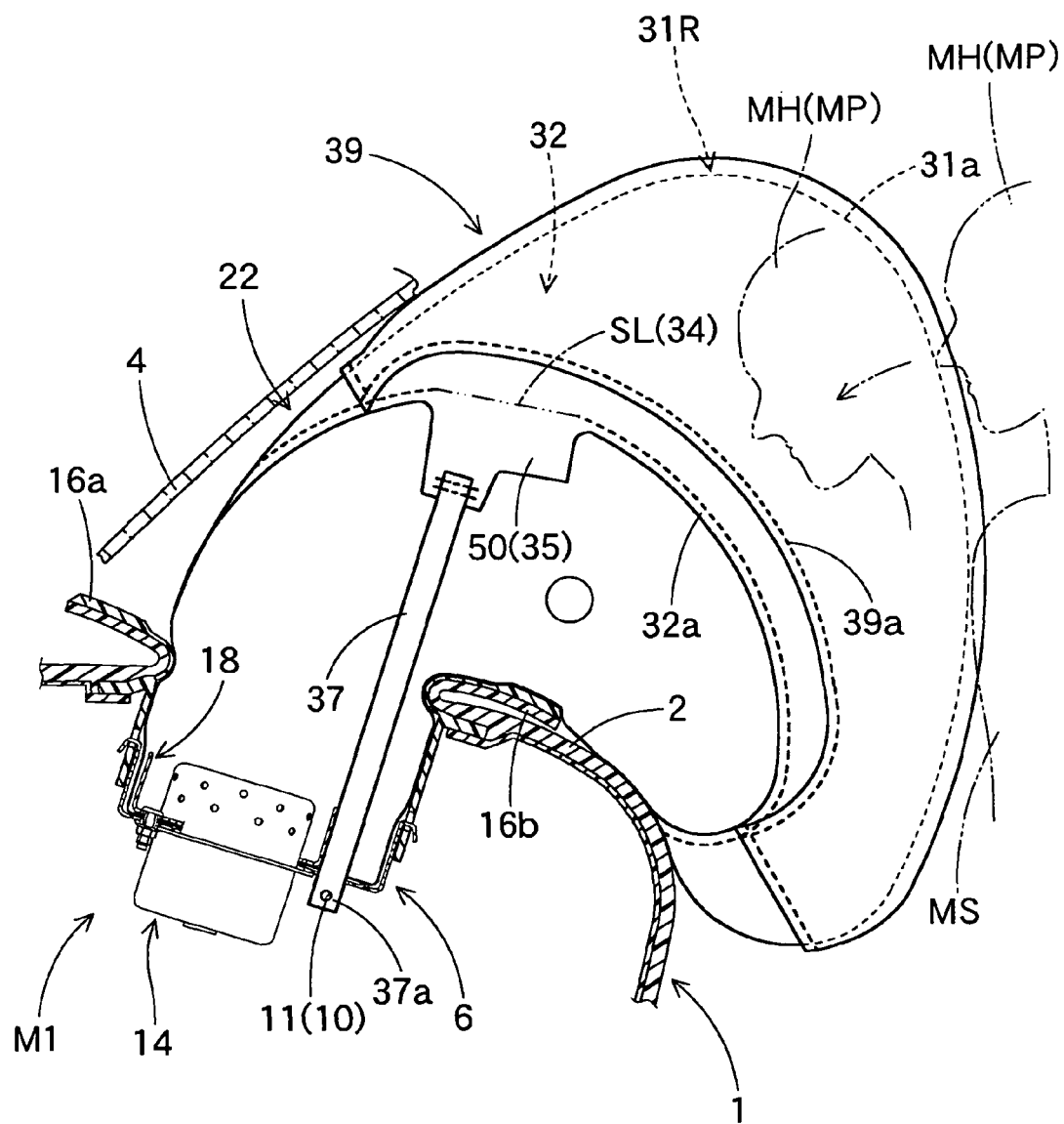
FIG. 12 is a schematic vertical section, taken along an anteroposterior direction, of the airbag apparatus of FIG. 1 at full inflation of the airbag in small-volume mode.

As best shown in FIG. 5, the rear side wall 22e of the bag body 22, which contacts and protects an occupant at deployment, includes raised regions 31L and 31R that are disposed side by side in a left and right direction and each of which is continuously raised in a vertical direction and a recessed area 32 that is recessed forward between the raised regions 31L and 31R. The raised regions 31L and 31R are designed to arrest shoulders MSL and MSR of an occupant MP upon airbag deployment, as indicated by double-dashed lines in FIG. 10, when the airbag 21 deploys in small-volume mode, i.e., when only the bag body 22 inflates. The recessed area 32 is designed to receive a head MH of the occupant MP with his/her shoulders MSL and MSR arrested by the raised regions 31L and 31R as shown in FIGS. 10 and 12. In this specific embodiment, the raised regions 31L, 31R and the recessed area 32 are arranged over an entire vertical area of the rear side wall 22e. More specifically, the unevenness created by the raised regions 31L and 31R and the recessed area 32 is most prominent at the upper end of the rear side wall 22e and continues to the upper side wall 22a and to the lower side wall 22b, extending down through the rear side wall 22e, while converging. In this embodiment, the seam (or the inner seam or inner joint) 58 that sews later-described inner circumferential edges 47a and 49a of a left inner panel 47 and a right inner panel 49 together forms the bottom or leading end 32a of the recessed area 32 whereas the seams (or outer seams or outer joints) 57L and 57R that respectively sew up each of later-described outer circumferential edges 47d and 49d of the left and right inner panels 47 and 49 and each of corresponding circumferential edges 44a and 45a of later-described left portion 44 and right portion 45 of outer panels 42 form tops 31a of the raised regions 31L and 31R (FIG. 9).

Figure 7A:
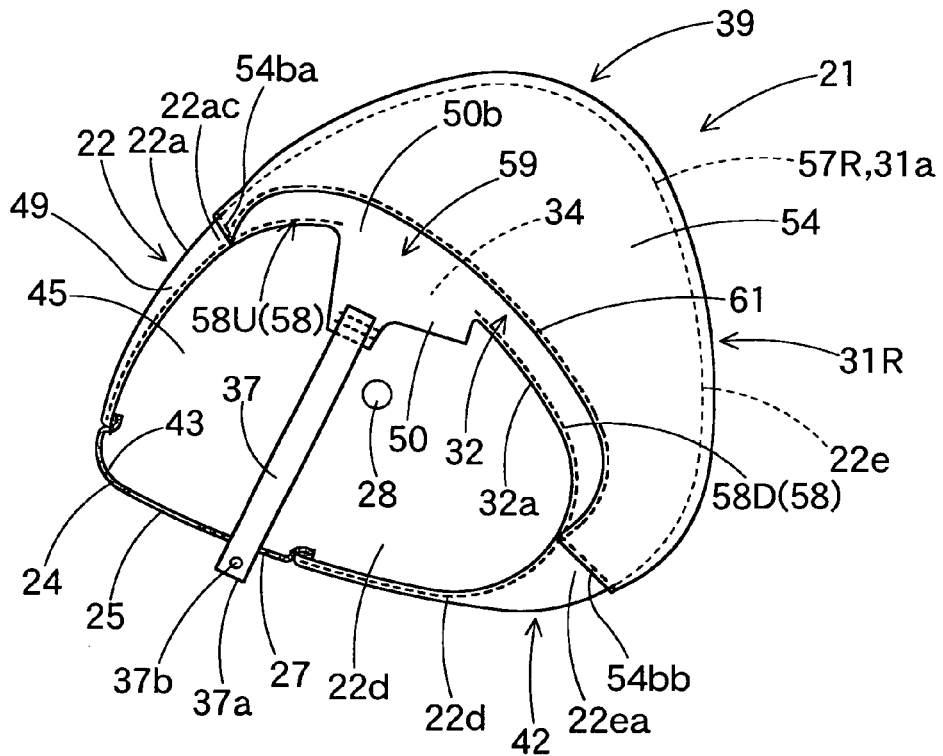
FIG. 7A is a schematic vertical section of the airbag of FIG. 4 as inflated in small-volume mode, taken along an anteroposterior direction.
Figure 7B:
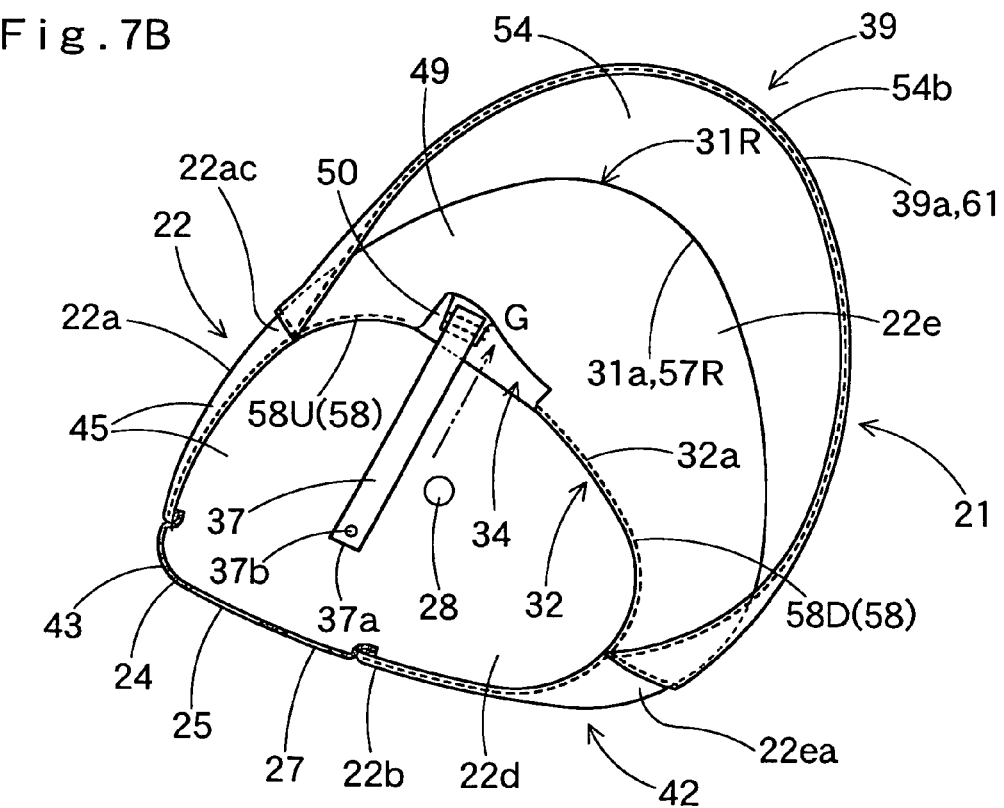
FIG. 7B is a schematic vertical section of the airbag of FIG. 4 as inflated in big-volume mode, taken along an anteroposterior direction.

The bag body 22 is provided, on the leading end 32a of the recessed area 32, with a communication hole 34 that communicates the bag body 22 and the supplementary bag 39. In this specific embodiment, the inner seam 58 that forms the leading end 32a of the recessed area 32 is not entirely continuous but has a ruptured portion halfway and this ruptured or unsewn portion constitutes the communication hole 34. Referring to FIGS. 7A and 7B, more specifically, the communication hole 34 is formed proximate the rear upper end of the recessed area 32. The open/close element 35 that opens and closes the communication hole 34 extends from the periphery of the communication hole 34. The open/close element 35 of this embodiment is comprised of a left extended portion 48 and a right extended portion 50 (FIG. 9) that extend inward from the inner circumferential edges of the inner panels 47 and 49. In other words, the inner seam 58 is left unsewn at the root of the extended portions 48 and 50, between inner seams 58U and 58D as shown in FIG. 9, and this unsewn portion, shown generally at numeral 59, forms the communication hole 34. When the left extended portion 48 and right extended portion 50 (i.e. the open/close element 35) are anchored to the anchor mechanism 10 by the connecting element 37, the extended portions 48 and 50 become appressed against each other due to the inner pressure of inflation gas flown into the bag body 22, and thus closes off the communication hole 34 by forming a sealing line SL (FIG. 12) along the unsewn portion 59, connecting ends of the inner seams 58U and 58D straightly.

The open/close element 35 is provided with a connecting element 37. The connecting element 37 is prepared separate from the bag body 22 and is fabricated of a flexible band-shaped cloth. This specific embodiment employs two connecting elements 37 that are sewn at the root ends to leading ends 48a and 50a of the left and right extended portions 48 and 50. Each of the connecting elements 37 includes at the leading end portion 37a an insert hole 37b for receiving the anchor pin 11 of the anchor mechanism 10. As shown in FIGS. 7A to 8B, each of the connecting elements 37 is arranged to extend across the interior of the bag body 22 such that the leading end portions 37a project out of the bag body 22 from the slit 27 and are connected to the anchor mechanism 10. The length of each of the connecting elements 37 is so designed as to allow the bag body 22 to inflate fully smoothly even when the bag body 22 inflates in the small-volume mode where the connecting elements 37 are anchored to the anchor mechanism 10 and the open/close element 35 keeps closing the communication hole 34. In this specific embodiment, moreover, each of the connecting elements 37 is designed to extend along the deployment direction of the bag body 22 and generally perpendicular to the opening plane of the case 6 when the bag body 22 inflates in the small-volume mode where the connecting elements 37 are kept anchored by the anchor pin 11 (FIG. 12).

The supplementary bag 39 is designed to cover the rear face of the bag body 22, at least the rear side wall 22e, at airbag deployment. Specifically, the supplementary bag 39 includes a supplementary bag panel 52 that is sewn to the bag body 22 by the entire periphery and a space provided between the panel 52 and the bag body 22. In this embodiment, the supplementary bag 39 is formed by locating the supplementary bag panel 52 on the bag body 22 to cover the communication hole 34 such that the supplementary bag 39 inflates in such a manner as to fill the recessed area 32 when the communication hole 34 opens up. More specifically, the supplementary bag 39 of this specific embodiment is arranged from the central area in an anteroposterior direction of the upper side wall 22a to the vicinity of the lower end of the rear side wall 22e, between tops 31a (FIGS. 4 and 5) of the raised regions 31L and 31R.

Figure 8A:
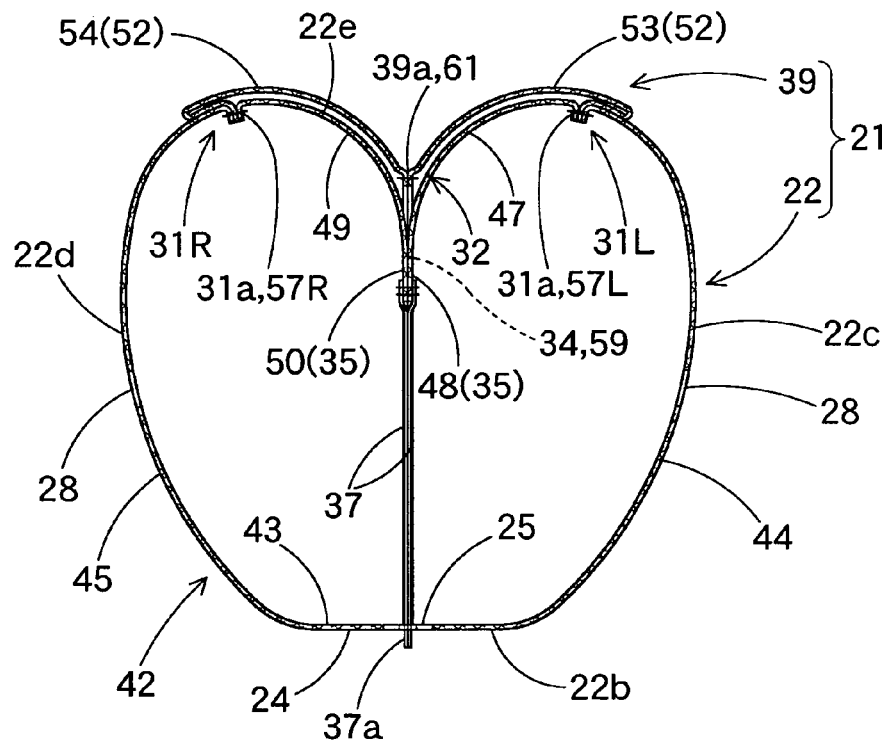
FIG. 8A is a schematic horizontal section of the airbag of FIG. 4 as inflated in small-volume mode.
Figure 8B:
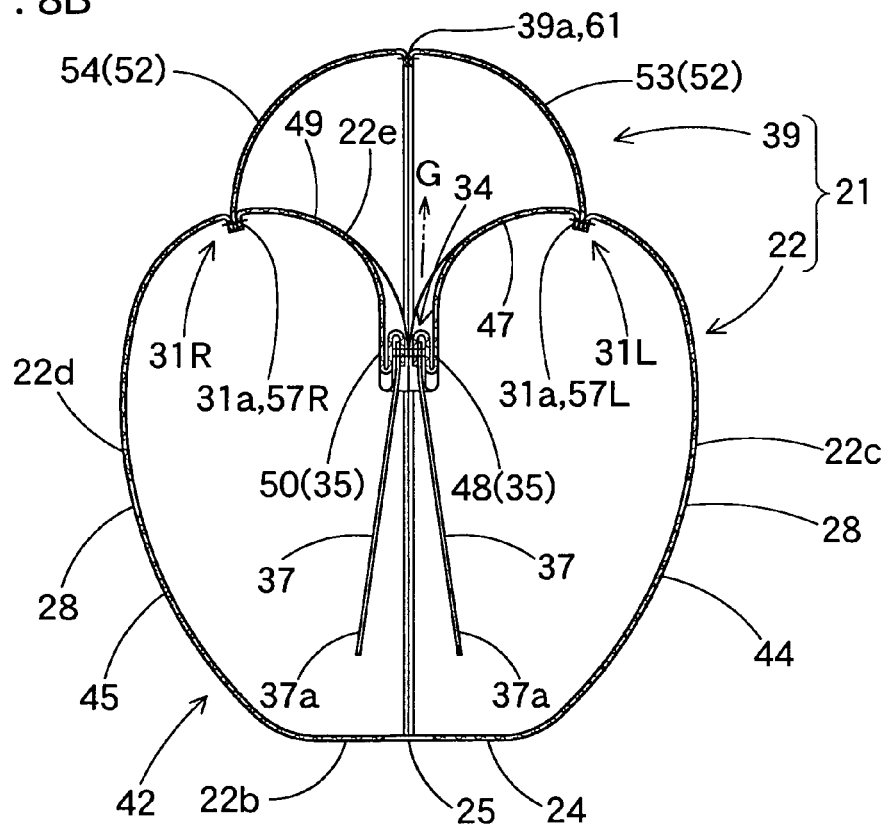
FIG. 8B is a schematic horizontal section of the airbag of FIG. 4 as inflated in big-volume mode.

The film length of the supplementary bag 39 in its horizontal section is greater than that of the bag body 22 between the tops 31a of the raised regions 31L and 31R in its horizontal section. The supplementary bag 39 is inflatable such that the central area in a left and right direction is most raised from upper side to rear side upon airbag inflation in the big-volume mode, as shown in FIGS. 7B and 8B. and this most raised area, or the top 39a is located either above or at the rear relative to the tops 31a of the raised regions 31L and 31R at inflation. The supplementary bag 39 of this specific embodiment is designed such that the degree of rise or projection at inflation is greatest at the upper end region of the rear side wall 22e, where the recessed area 32 of the bag body 22 is most recessed. When the airbag 21 inflates in the small-volume mode, the supplementary bag 39 is not fed with inflation gas and arranged in such a manner as to cover the area between the tops 31a of the raised regions 31L and 31R. At this time, since the film length of the supplementary bag 39 is greater than that of the bag body 22 between the tops 31a, the supplementary bag 39 is arranged in a loose fitting manner between the raised regions 31L and 31R as shown in FIG. 8A. The top 39a of the supplementary bag 39 is comprised of a seam 61 that sews together inner circumferential edges 53b and 54b of later-described left panel 53 and right panel 54 of the supplementary bag panel 52.

The airbag 21 (bag body 22 and supplementary bag 39) and open/close element 35 are made of flexible woven fabric of polyamide, polyester or the like. Referring to FIG. 9, the airbag 21 is formed by sewing together circumferential edges of predetermined shaped base cloths: an outer panel 42 that constitutes the left side wall 22c, right side wall 22d and a front part of the lower side wall 22b, a pair of inner panels; a left inner panel 47 and right inner panel 49 that constitute the upper side wall 22a, rear side wall 22e and a rear part of the lower side wall 22b, and a supplementary bag panel 52 the forms the supplementary bag 39.

The outer panel 42 has a laterally symmetric contour proximate to a figure of a butterfly spreading its wings. As shown in FIG. 9, the outer panel 42 includes a generally rectangular lower part 43 that constitutes the peripheral area 24 of the gas inlet port 25 and left and right portions 44 and 45 each of which having a generally square plate shape, arranged in such a manner as to extend leftward and rightward from the lower part 43. The lower part 43 makes the front part of the lower side wall 22b of the bag body 22 at full inflation. The left and right portions 44 and 45 mainly constitute left and right side walls 22c and 22d of the bag body 22 at full inflation, respectively.

The left inner panel 47 and right inner panel 49 are configured into a laterally symmetrical pair of bands each curving in a generally C-shape. The inner panels 47 and 49 have such a configuration as to split up an area from the upper side wall 22a to the rear part of the lower side wall 22b, and constitute the upper side wall 22a, rear side wall 22e and the rear part of the lower side wall 22b. The outer circumferential edges 47d and 49d of the inner panels 47 and 49 are configured to generally accord to the curvature of the circumferential edges 44a and 45a of the left portion 44 and right portion 45 of the outer panel 42.

Each of the left inner panel 47 and right inner panel 49 are provided on the inner circumferential edges 47a and 49a with the left extended portion 48/right extended portion 50 as described above. Each of the left and right extended portions 48 and 50 is generally rectangular in shape. The extended portions 48 and 50 are arranged in an overlapping manner and are not connected together at any circumferences. That is, the extended portions 48 and 50 are not connected together even at the root portions 48b and 50b, and this unsewn portion (uncoupled portion) 59 formed on the root portions 48b and 50b, which is formed by separating the inner seams 58U and 58D that sew together the inner circumferential edges 47a and 49a of the left and right inner panels 47 and 49, forms the communication hole 34 that feeds inflation gas to the supplementary bag 39 when opening.

The supplementary bag panel 52 is comprised of a pair of panels; the left panel 53 and right panel 54. The panels 53 and 54 are designed such that their outer circumferential edges 53a and 54a curve according to the contours at rear regions of the outer circumferential edges 47d and 49d of the inner panels 47 and 49 and of the circumferential edges 44a and 45a of the left portion 44 and right portion 45 of the outer panel 42. The panels 53 and 54 each have a generally triangular plate shape defined by the outer circumferential edges 53a and 54a and inner circumferential edges 53b and 54b that connect opposite ends of the outer circumferential edges 53a and 54a generally straightly. As shown in FIG. 9, the width L1 in a left and right direction of each of the left and right panels 53 and 54 of the supplementary bag panel 52 is greater than the width L2 in a left and right direction of each of the left and right inner panels 47 and 49, such that each of the left and right panels 53 and 54 intrude into an inner area of each of the C-shaped inner panels 47 and 49, overpassing the inner circumferential edges 47a and 49a, when superimposed on the inner panels 47 and 49.

This configuration makes the film length of the supplementary bag 39 greater than that of the bag body 22 between the tops 31a of the raised regions 31L and 31R in a horizontal section as described above, such that the top 39a of the supplementary bag 39, which is comprised of the seam 61 that sews together the inner circumferential edges 53b and 54b of the left panel 53 and right panel 54, become considerably raised from upper side to rear side at inflation. As shown in FIG. 8, the outer circumferential edges 53a and 54a of the left panel 53 and right panel 54 of this specific embodiment are sewn together into the outer seams 57L and 57R that respectively sew up each of the outer circumferential edges 47d and 49d of the left and right inner panels 47 and 49 and each of corresponding circumferential edges 44a and 45a of the left portion 44 and right portion 45 of the outer panel 42, respectively, and thus coupled to the bag body 22. As shown in FIGS. 7A and 7B, front end regions 53ba and 54ba of the inner circumferential edge 53b and 54b in the left and right panels 53 and 54 are separated and sewn to the left and right inner panels 47 and 49 at the central region 22ac in an anteroposterior direction of the upper side wall 22a in a straightly extended condition. Rear end regions 53bb and 54bb of the inner circumferential edge 53b and 54b in the left and right panels 53 and 54 are separated and sewn to the left and right inner panels 47 and 49 proximate the bottom 22ea of the rear side wall 22e in a straightly extended condition.

The airbag 21 is inflatable in small-volume mode where the communication hole 34 is closed and in big-volume mode where the communication hole 34 is open. In small-volume mode, the airbag 21 or the bag body 22 inflates with the communication hole 34 closed off by the open/close element 35 and thus with the supplementary bag 39 not fed with inflation gas as shown in FIGS. 7A and 8A. In big-volume mode, the airbag 21 inflates with the communication hole 34 opened such that the supplementary bag 39 is fed with inflation gas G as shown in FIGS. 7B and 8B.

Manufacturing of the airbag 21 is now described. The connecting elements 37 are preliminarily sewn to the left extended portion 48 and right extended portion of the left and right inner panels 47 and 49. The left panel 53 and right panel 54 of the supplementary bag panel 52 are overlaid one on the other such that the outer surfaces are opposed to each other, and regions of the inner circumferential edges 53b and 54b except the front end regions 53ba and 54ba and rear end regions 53bb and 54bb, i.e. the middle regions of the inner circumferential edges 53b and 54b, are stitched together to form the seam 61. Then the left and right inner panels 47 and 49 are overlapped one on the other such that the outer surfaces are opposed to each other, and the inner circumferential edges 47a and 49a are stitched together except the root portions 48b and 50b of the left and right extended potions 48 and 50, and thus forming the inner seam 58. Subsequently, the left and right panels 53 and 54 are opened to the left and right from the seam 61 such that the front end regions 53ba and 54ba and rear end regions 53bb and 54bb form a single generally straight line, whereas the left and right inner panels 47 and 49 are opened to the left and right from the inner seam 58. The supplementary bag panel 52 are arranged over the left and right inner panels 47 and 49 such that the seam 61 opposes the outer surfaces of the left and right inner panels 47 and 49, and then the front end regions 53ba and 54ba and rear end regions 53bb and 54bb of the supplementary bag panel 52 are respectively sewn to the left and right inner panels 47 and 49.

Thereafter, the left and right inner panels 47 and 49 are opened so that the front edges 47b and 49b form a single generally straight line, and these front edges 47b and 49b are sewn to the front edge 43a of the lower part 43 of the outer panel 42. Likewise, rear edges 47c and 49c of the left and right inner panels 47 and 49 are arranged generally straightly and sewn to the rear edge 43b of the lower part 43. Then front and rear left edges 43c of the lower part 43 are sewn to root regions 44b of the circumferential edge 44a of the left portion 44 whereas front and rear right edges 43d are sewn to root regions 45b of the circumferential edge 45a in the right portion 45. Then the circumferential edge 44a of the left portion 44, the outer circumferential edge 47d of the left inner panel 47 and the outer circumferential edge 53a of the left panel 53 of the supplementary bag panel 52 are sewn together to form the outer seam 57L. Likewise, the circumferential edge 45a of the right portion 45, the outer circumferential edge 49d of the right inner panel 49 and the outer circumferential edge 54a of the right panel 54 of the supplementary bag panel 52 are sewn together to form the outer seam 57R. If the bag body 22 is reversed inside out utilizing the gas inlet port 25 so that seam allowances may not appear outside, the airbag 21 (the bag body 22 and supplementary bag 39) is completed together with the open/close element 35.

To mount the airbag 21 thus manufactured on the vehicle, the retainer 18 is placed inside the airbag 21 so that the bolts 18a project from the mounting holes 26. The airbag 21 is then folded up to fit in the case 6, and a breakable wrapping sheet (not shown) is wound around the folded-up airbag 21 to keep the folded-up configuration. At this time, the leading end portion 37a of the connecting element 37 is taken out from the slit 27 and placed outside the wrapping sheet. Then the folded-up airbag 21 is placed on the bottom wall 7 of the case 6 so that the bolts 18 project out of the bottom wall 7 and the insert hole 37b formed on the leading end portion 37a of the connecting element 37 protrudes out of the through hole 7b. Thereafter, the connecting element 37 is joined to the anchor mechanism 10 secured to the underside of the bottom wall 7 by inserting the anchor pin 11 into the insert hole 37b of the leading end portion 37a. Subsequently, the body 14a of the inflator 14 is set in the case 6 from the lower side of the bottom wall 7 via the insert hole 7a while the bolts 18a protruding downward from the bottom wall 7 are inserted through the flange 14c of the inflator 14. Thereafter, by fastening the bolts 18a protruding from the flange 14c of the inflator 14 into the nuts 19, the folded-up airbag 21 and the inflator 14 are secured to the bottom wall 7 of the case 6.

Then the circumferential wall 8 of the case 6 is attached to the joint wall 16c of the airbag cover 16 on the dashboard 1 having been mounted on vehicle, the unillustrated brackets of the case 6 are secured to predetermined positions of the vehicle body structure, and the inflator 14 and the actuator 12 for the anchor mechanism 10 are electrically connected with the control device 64, and thus the airbag apparatus M1 is mounted on the vehicle.

Figure 13:
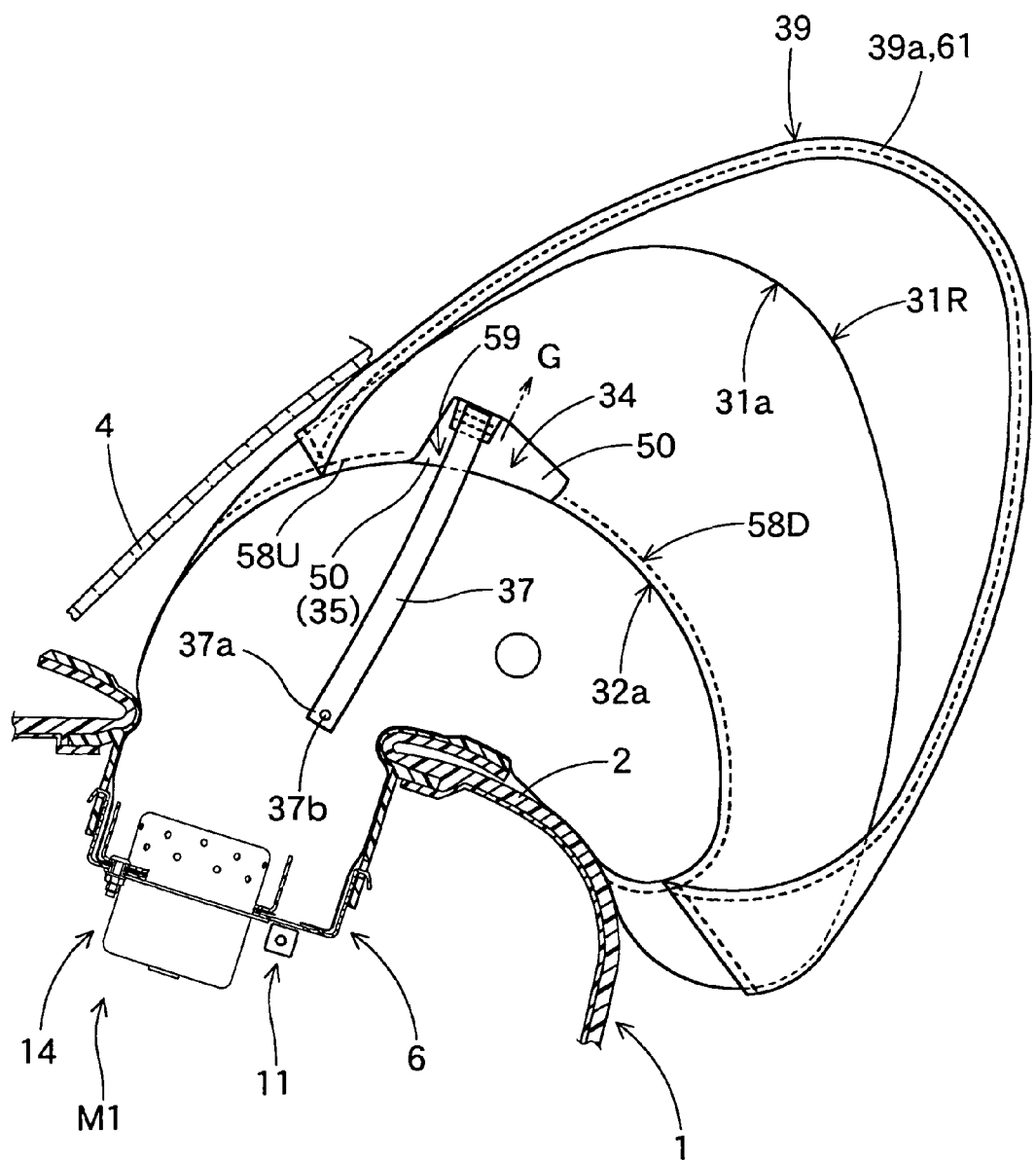
FIG. 13 is a schematic vertical section, taken along an anteroposterior direction, of the airbag apparatus of FIG. 1 at full inflation of the airbag in big-volume mode.

After mounting the airbag apparatus M1 on vehicle, in the event of collision of vehicle, the control device 64 feeds actuating signals to the inflator 14 so that inflation gas G is discharged from the gas discharge ports 14b of the inflator 14 to inflate the airbag 21. Then the airbag 21 breaks the wrapping sheet, and pushes and opens the doors 16a and 16b of the airbag cover 16 as shown in FIGS. 12 and 13. Then the airbag 21 protrudes upward from an opening provided by the opening of the doors 16a and 16b, and deploys rearward in such a manner as to fill in a space between the top face 2 of the dashboard 1 and windshield 4. Thus the airbag 21 completes inflation as shown in FIGS. 1 and 10 to 13.

Figure 11:
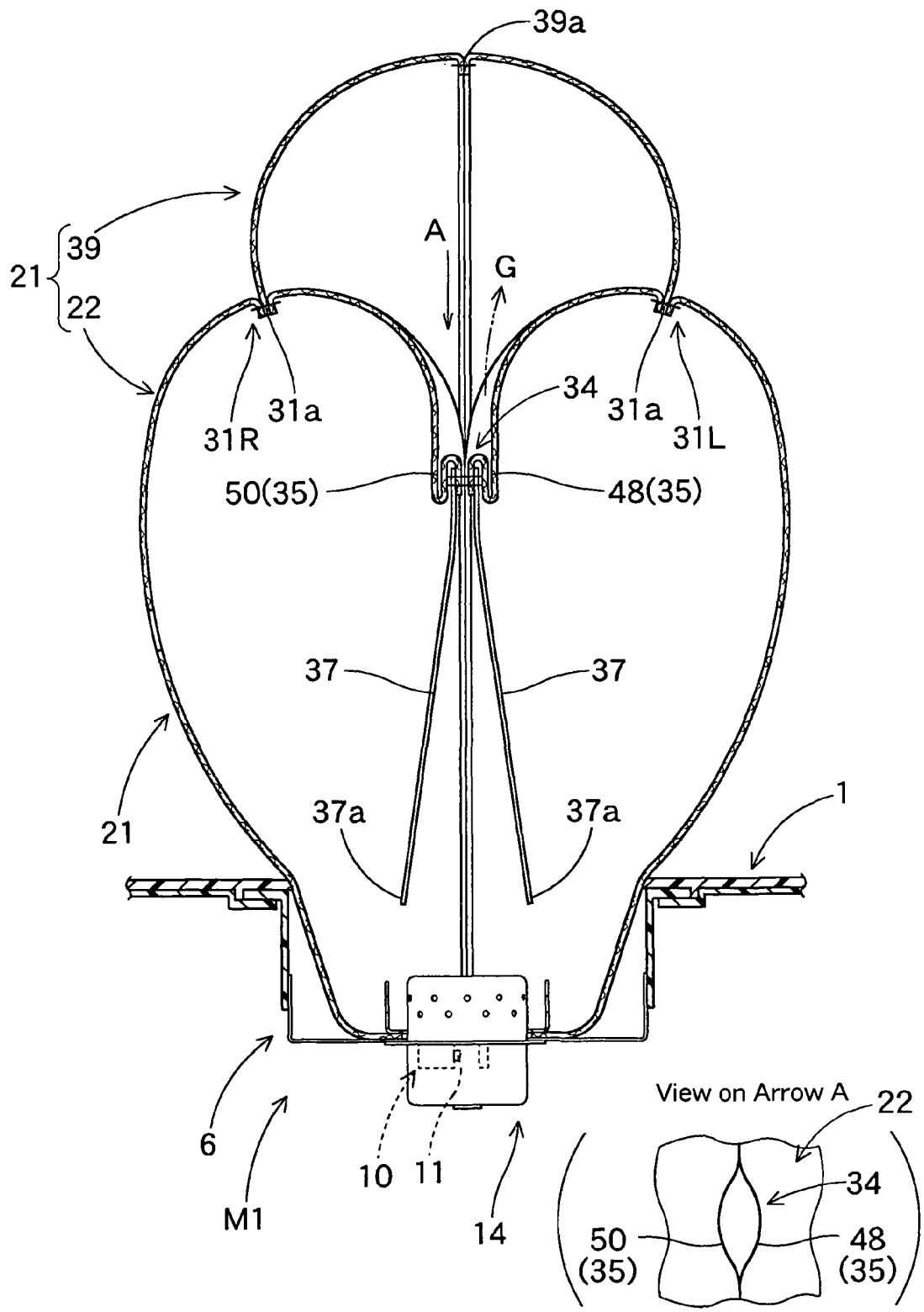
FIG. 11 is a schematic horizontal section of the airbag apparatus of FIG. 1 at full inflation of the airbag in big-volume mode.

In the airbag apparatus M1 of the first embodiment, the airbag 21 includes the bag body 22, the supplementary bag 39, the communication hole 34 that communicates the bag body 22 and supplementary bag 39, and the open/close element 35 that opens and closes the communication hole 34. If the leading end portion 37a of the connecting member 37 extending from the open/close element 35 is kept anchored by the anchor mechanism 10, the airbag 21 inflates with the communication hole 34 closed off by the open/close element 35, such that the supplementary bag 39 is not fed with inflation gas, i.e. the airbag 21 completes inflation in small-volume mode in which only the bag body 22 inflates, as shown in FIGS. 10 and 12. If the connecting element 37 is not anchored by the anchor mechanism 10, the communication hole 34 is allowed to open up and inflation gas G flows into the supplementary bag 39 such that the airbag 21 completes inflation in big-volume mode in which both the bag body 22 and supplementary bag 39 inflate as shown in FIGS. 11 and 13. That is, since the inflation of the supplementary bag 39 is triggered only by disconnecting the connecting element 37 and anchor mechanism 10, the timing of opening of the communication hole 34 is steady. Furthermore, the opening of the communication hole 34 assures the inflation of entire supplementary bag 39. Accordingly, the contour of the airbag 21 is steady at full inflation in big-volume mode.

Therefore, in the airbag apparatus M1 of the first embodiment, the airbag 21 is inflatable quickly into a steady contour in each of inflation modes although controlled by the control device 64 that controls contours of the airbag 21 at full inflation.

Especially, the airbag apparatus M1 of the first embodiment is designed suitable in use for installation in front of a front passenger's seat for protecting a passenger M seated in the front passenger's seat. The airbag 21 is provided at least on the rear area of the bag body 22 at airbag inflation with the recessed area 32 that recesses forward and extends generally vertically at the center in a left and right direction and the two raised regions 31L and 31R that is located on the left and right of the recessed area 32 and extend generally vertically, the raised regions 31L and 31R being raised relative to the recessed area 32. The supplementary bag 39 is located on the rear area of the bag body 22 so as to fill up the recessed area 32 between the raised regions 31L and 31R as shown in FIGS. 11 and 13 in big-volume mode, i.e., when the communication hole 34 opens up.

With this configuration, if the control device 64 detects an undersized passenger MP1 (FIG. 1) seated in the front passenger's seat or a passenger MP seated proximate the dashboard 1 by signals fed from the sensors 65, 66 and 67, the actuator 12 of the anchor mechanism 10 is not actuated and the airbag 21 inflates in small-volume mode where the leading end portion 37a of the connecting element 37 is anchored by the anchor pin 11, and thus inflating only the bag body 22 (FIGS. 10 and 12). Accordingly, the raised regions 31L and 31R and the recessed area 32 are formed at least on the rear side of the airbag 21. When the bag body 22 thus inflated is thrown against the passenger MP moving forward, the left and right raised regions 31L and 31R firstly receive the vicinities of left and right shoulders MSL and MSR of the passenger MP, thereby reducing forward kinetic energy of the passenger MP. Thereafter, the head MH of the passenger MP enters into the recessed area 32 with the shoulders MSL and MSR restrained by the raised regions 31L and 31R and then is restrained and suppressed from moving forward as shown in FIGS. 10 and 12. Accordingly, the airbag 21 is capable of receiving the head MH of the undersized passenger MP1 or the passenger MP seated proximate the apparatus M1 softly while applying as little reaction force as possible since the kinetic energy of the passenger has been reduced by the raised regions 31L and 31R.

On the contrary, if the control device 64 detects a large passenger MP2 (FIG. 1) or a passenger MP seated away from the dashboard 1, it feeds an actuating signal to the inflator 14 and anchor mechanism 10 to retract the anchor pin 11, so that the leading end portion 37a of the connecting element 37 is released from the pin 11 and the airbag 21 inflates in big-volume mode, thereby inflating both the bag body 22 and supplementary bag 39 as shown in FIGS. 11 and 13. Since the supplementary bag 39 inflates in such a manner as to fill up the recessed area 32 between the raised regions 31L and 31R in big-volume mode, the airbag 21 securely protects even the large passenger MP2 or the passenger MP seated away from the dashboard 1 with a sufficient cushioning property, and without bottoming out.

Since the film length of the supplementary bag 39 in the foregoing embodiment is greater than that of the bag body 22 between the tops 31a of the raised regions 31L and 31R in the horizontal section, the supplementary bag 39 is arranged in a loose fitting, floating manner on the rear side wall 22e between the tops 31a of the raised regions 31L and 31R when the airbag 21 inflates in small-volume mode. However, this will not hinder smooth protection of the head MH of the passenger MP since no inflation gas will be admitted between the supplementary bag 39 and bag body 22 and the supplementary bag 39 will be brought into close contact with the rear side wall 22e when pushed by the head MH.

Although the film length of the supplementary bag 39 of this specific embodiment is greater than that of the bag body 22 between the tops 31a of the raised regions 31L and 31R in the horizontal section as described above, the contour of the supplementary bag should not be limited thereby. On condition that the supplementary bag inflates in such a manner as to fill the recessed area in big-volume mode, the film length of the supplementary bag may be generally equal to that of the bag body between the tops of the raised regions in the horizontal section. In this case, the supplementary bag will not be loose relative to the bag body even at inflation in small-volume mode.

In the first embodiment, the open/close element 35 is comprised of the left and right extended portions 48 and 50 of the left and right inner panels 47 and 49 that are formed by extending the inner circumferential edges 47a and 49a of the panels 47 and 49 partially toward an interior of the bag body 22. The left and right inner panels 47 and 49 are sewn together by the inner circumferential edges 47a and 49a but have the unsewn or uncoupled portion 59 at the root regions 48b and 50b of the extended portions 48 and 50, and this uncoupled portion 59 constitutes the communication hole 34. That is, the open/close element 35 and communication hole 34 are formed when sewing the inner circumferential edges 47a and 49a of the left and right inner panels 47 and 49 together except the root regions 48b and 50b of the extended portions 48 and 50 during the sewing work of the bag body 22, and thus omitting an extra work of cutting out a portion of base cloth(s) of the bag body 22 in order to create an opening for the communication hole. Thus the airbag apparatus M1 of the foregoing embodiment is comprised of fewer number of parts, and thereby reducing the number of processes and cost required to manufacture an airbag apparatus. However, without considering such an advantage, the communication hole may be formed by cutting out a portion of a base cloth of the bag body as described later in the second embodiment.

In the airbag apparatus M1 according to the first embodiment, when the airbag 21 deploys in small-volume mode, the connecting elements 37 extending from the open/close element 35 are held by the anchor pin 11 of the anchor mechanism 10 and pulls the open/close element 35 or left and right extended portions 48 and 50 into the bag body 22. At this time, as shown in FIG. 10, the extended portions 48 and 50 become appressed against each other due to the inner pressure of inflation gas flown into the bag body 22, and thus forming the sealing line SL (FIG. 12) along the unsewn portion 59, connecting ends of the inner seams 58U and 58D straightly.

Accordingly the communication hole 34 is securely closed off so as not to let inflation gas flow into the supplementary bag 39. When the airbag 21 deploys in big-volume mode, the connecting elements 37 are released from the anchor pin 11 of the anchor mechanism 10. At this time, although the communication hole 34 is closed at first, the left and right extended portion 48 and 59 are gradually pushed toward the outside (toward the supplementary bag 39) by inflation gas G and separate from each other, and then the communication hole 34 opens up itself along with inflow of inflation gas G as shown in a parenthesis in FIG. 11. Thus the communication hole 34 securely opens when the airbag 21 inflates in big-volume mode.

In the airbag apparatus M1, moreover, the communication hole 34 is formed at the bottom or leading end 32a of the recessed area 32. With this configuration, the bag body 22 inflates with the leading end 32a of the recessed area 32 connected to the anchor mechanism 10 by the connecting element 37, in other words with the leading end 32a of the recessed area 32 pulled toward the anchor mechanism 10 (toward the case 6) when inflating in small-volume mode. Accordingly, the recessed area 32 is formed into a steady recessed contour.

Furthermore, the anchor mechanism 10 of the airbag apparatus M1 is located on the underside of the bottom wall of the case 6, and the connecting element 37 is designed to extend generally along the deployment direction of the airbag 21 at airbag inflation in small-volume mode. With this configuration, the connecting element 37 pulls the leading end 32a of the recessed area 32 toward the anchor mechanism 10 in a stable manner at airbag inflation in small-volume mode, such that the contour of the concave of the recessed area 32 is further stabilized and the closure of the communication hole 34 by the open/close element 35 is constantly assured.

The second embodiment of the invention is now described. The airbag apparatus M2 according to the second embodiment is suitable in use for a front passenger's seat as well, and is installed in an interior of the top face 2 of the dashboard 1 in front of a front passenger's seat. The airbag apparatus M2 has a similar structure to the airbag apparatus M1 of the first embodiment except the airbag 21A, and therefore, descriptions of common parts will be omitted while assigning common reference numerals to those parts. The airbag 21A used in the second embodiment has a similar structure to the airbag 21 of the first embodiment except the communication hole 70 and open/close element 72 as shown in FIG. 14. Therefore, descriptions will be omitted for common parts while adding a reference code "A" to the reference numerals of the common parts.

Figure 14A:
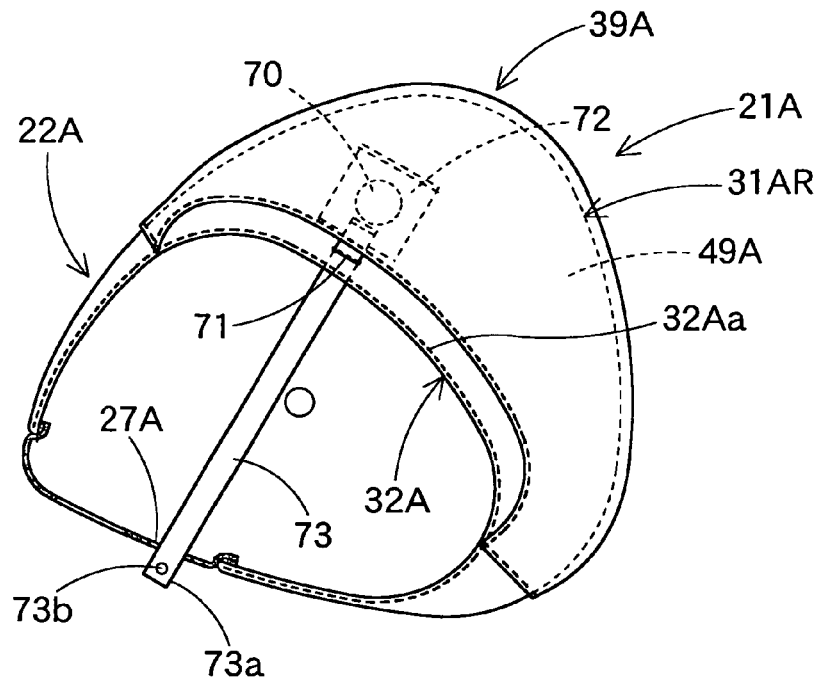
FIG. 14A is a schematic vertical section, taken along an anteroposterior direction, of an airbag used in an airbag apparatus according to the second embodiment of the invention, at full inflation in small-volume mode.
Figure 14B:
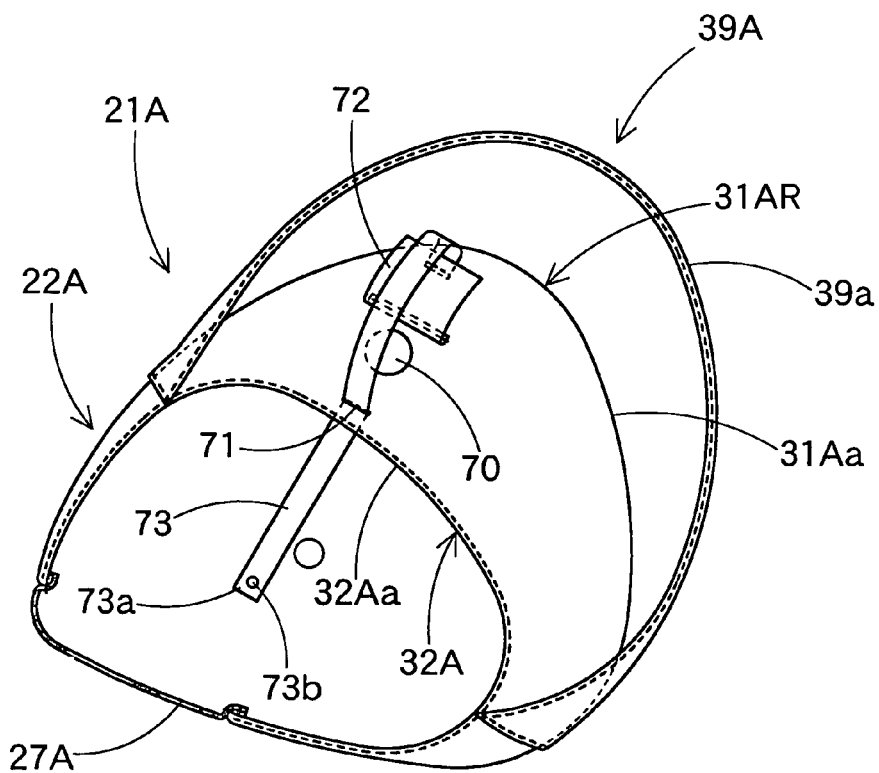
FIG. 14B is a schematic vertical section, taken along an anteroposterior direction, of the airbag of FIG. 14A, at full inflation in big-volume mode.

As shown in FIGS. 14A and 14B, the communication hole 70 is located on an area of the bag body 22A to be covered by the supplementary bag 39A, specifically between the top 31Aa of the raised portion 31AR and the leading end (bottom) 32Aa of the recessed area 32A. The communication hole 70 is formed by cutting out a portion of the inner right panel 49A in a circular shape in the vicinity of the rear upper end of the bag body 22A at full inflation. The open/close element for opening and closing the communication hole 70 is comprised of a flap member 72 secured to the periphery of the communication hole 70 by part of the circumferential edge. A slit 71 for receiving the connecting member 73 is formed in the periphery of the communication hole 70 and at the position of the bag body 22A on which the leading end 72b of the flap member 72 opposite from the secured circumferential edge is located when the flap member 72 closes the hole 70.

The flap member 72 is a flexible sheet-like member having a generally rectangular shape and is located on the outer circumference of the bag body 22A for closing the communication hole 70, as shown in FIGS. 14A to 15B. Specifically, the flap member 72 is fabricated of flexible fabric of polyamide, polyester or the like similarly to base cloths for forming the airbag 21A. In this specific embodiment, the flap member 72 is arranged on the bag body 22A at a slant relative to a vertical direction, such that one side of the flap 72 extends along the length direction of the connecting element 73 anchored by the anchor mechanism 10 at airbag inflation in small-volume mode. The flap member 72 is sewn to the periphery of the communication hole 70 by the circumferential edge 72a facing away from the connecting element 73.

Figure 16:
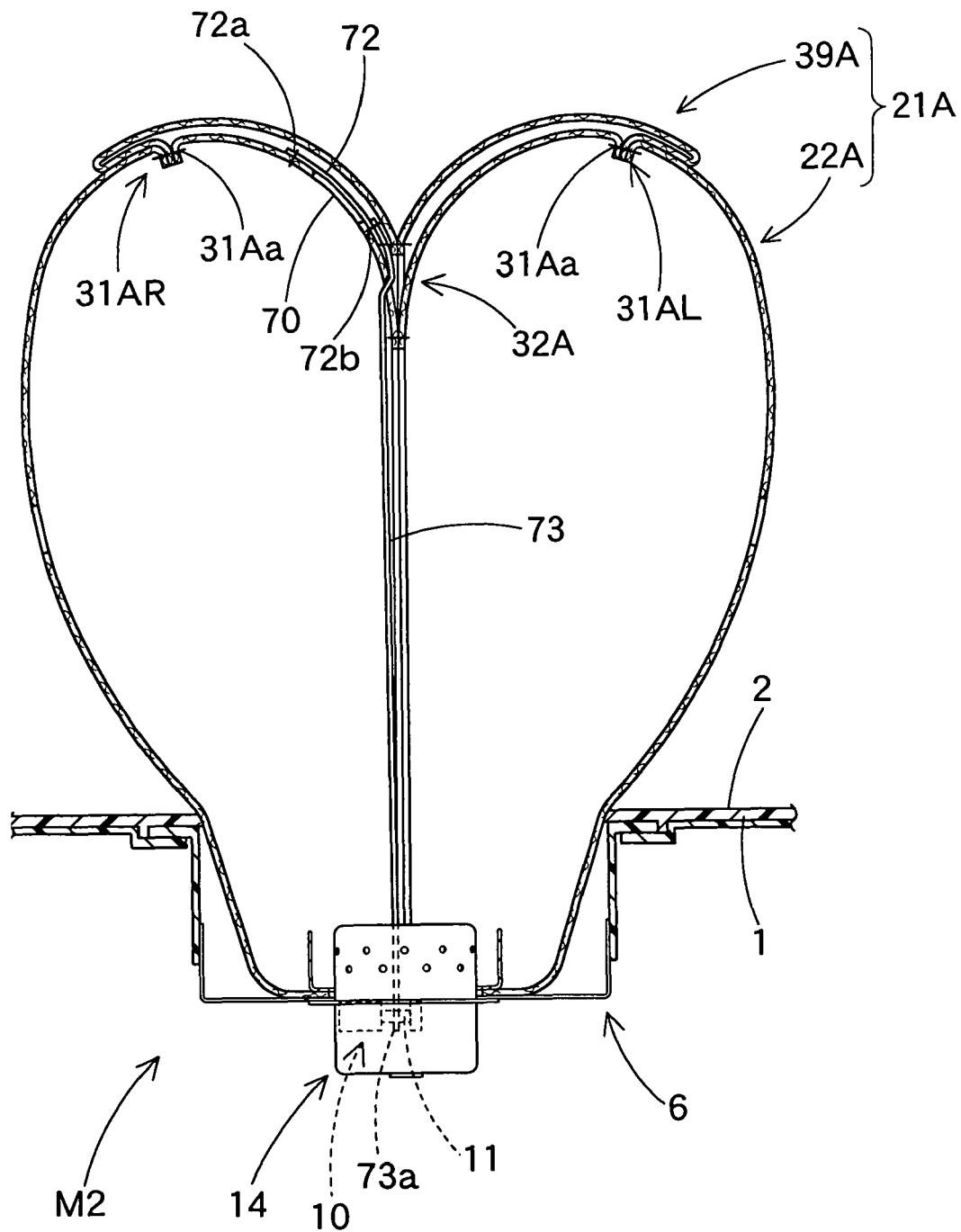
FIG. 16 is a schematic horizontal section of the airbag apparatus of the second embodiment at full inflation of the airbag in small-volume mode.

The connecting element 73 extends from the circumferential edge 72b of the flap member 72 opposite from the edge 72a sewn to the bag body 22A, i.e. from the leading end 72b. Similarly to the connecting element 37 of the first embodiment, the connecting element 73 is fabricated of a flexible band-shaped cloth. The connecting element 73 includes at the leading end portion 73a an insert hole 73b for receiving the anchor pin 11 of the anchor mechanism 10. As shown in FIGS. 14A, 14B and 16, the connecting element 73 is inserted through the slit 71 into the bag body 22A and taken out from the slit 27 at the leading end portion 73a such that the insert hole 73b is connected to the anchor mechanism 10. The length of the connecting element 73 is so designed as to allow the bag body 22A to inflate fully smoothly even when the bag body 22A inflates in small-volume mode where the connecting element 73 is anchored by the anchor mechanism 10 and the flap member 72 keeps closing the communication hole 70. Similarly to the first embodiment, the connecting element 73 is designed to extend along the deployment direction of the bag body 22A and generally perpendicular to the opening plane of the case 6 when the bag body 22A inflates in the small-volume mode where the connecting element 73 is kept anchored by the anchor pin 11.

Figure 17:
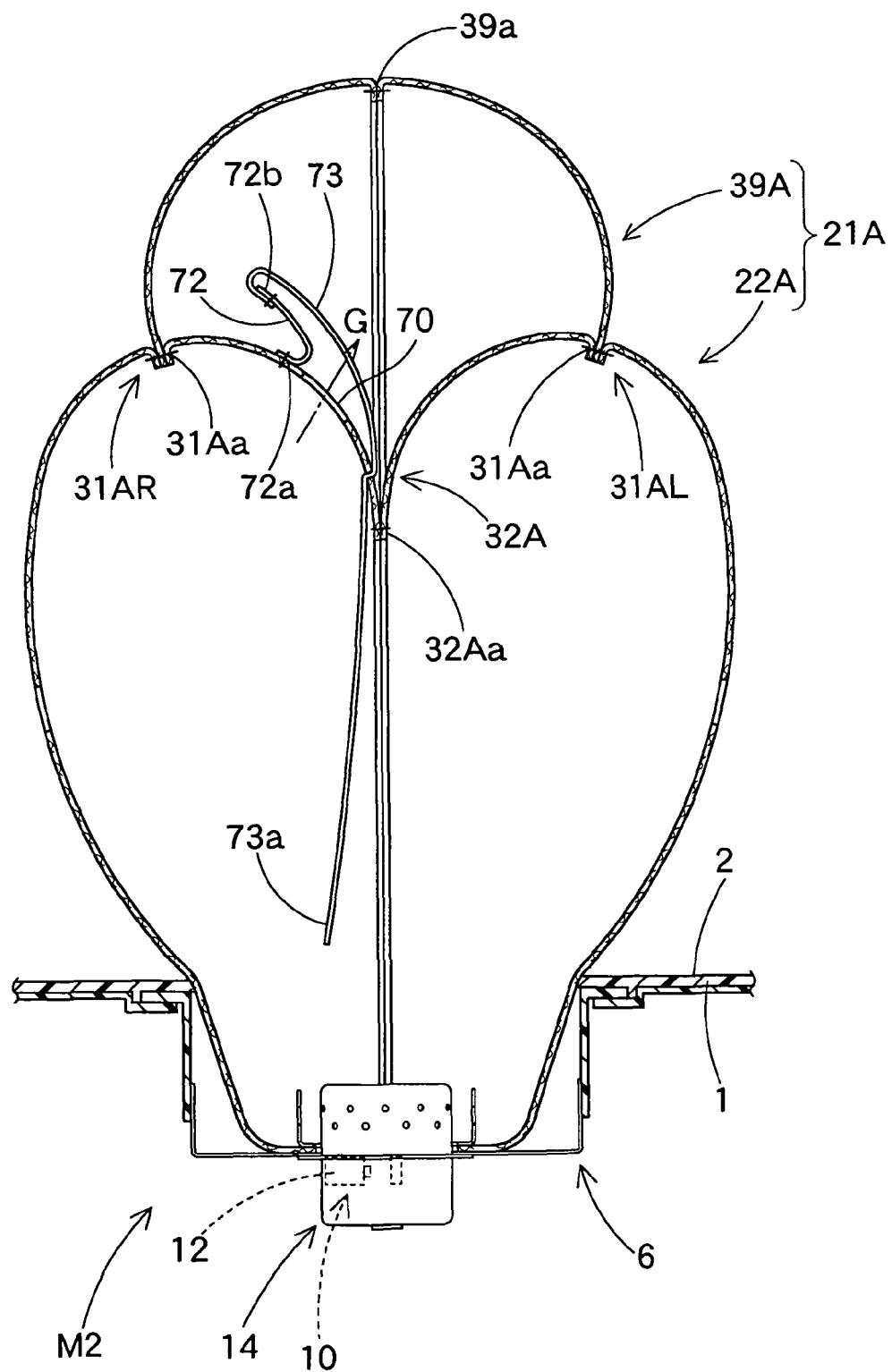
FIG. 17 is a schematic horizontal section of the airbag apparatus of the second embodiment at full inflation of the airbag in big-volume mode.

In operation, the airbag 21A is inflatable in the small-volume mode where the communication hole 70 is closed and in the big-volume mode where the communication hole 70 is open. Specifically, when actuated in small-volume mode, the connecting element 73 extending from the flap member 72 is kept anchored by the anchor mechanism 10 and the flap member 72 keeps closing the communication hole 70, such that the airbag 21A or bag body 22A completes inflation with the supplementary bag 39 not fed with inflation gas (FIGS. 14A and 16). In big-volume mode, the connecting element 73 is released from the anchor pin 11 of the anchor mechanism 10, and then inflation gas G pushes up the flap member 72 and eventually opens up the communication hole 70, such that the gas G flows into the supplementary bag 39A as shown in FIGS. 14B and 17.

The airbag apparatus M2 of the second embodiment is manufactured and mounted on a vehicle similarly to the first embodiment.

In the airbag apparatus M2 of the second embodiment, too, the airbag 21A includes the bag body 22A, the supplementary bag 39A, the communication hole 70 that communicates the bag body 22A and supplementary bag 39A, and the flap member 72, acting as the open/close element, that opens and closes the communication hole 70. The opening of the communication hole 70 and inflation of the supplementary bag 39A are triggered only by disconnecting the connecting element 73 extending from the flap member 72 and anchor mechanism 10, and therefore, the timing of opening of the communication hole 70 is steady. Furthermore, the opening of the communication hole 70 assures the inflation of entire supplementary bag 39A. Accordingly, the contour of the airbag 21A is steady at full inflation in big-volume mode.

Therefore, in the airbag apparatus M2 of the second embodiment, too, the airbag 21A is inflatable quickly into a steady contour in each of inflation modes although controlled by a control device that controls contours of the airbag 21A at full inflation.

Moreover, since the open/close element of the second embodiment is formed by the flap member 72 having a flexible sheet shape, the flap member 72 and connecting element 73 are foldable together with the airbag 21A, which is conducible to downsizing and simplification of the airbag apparatus.

Figure 15A:
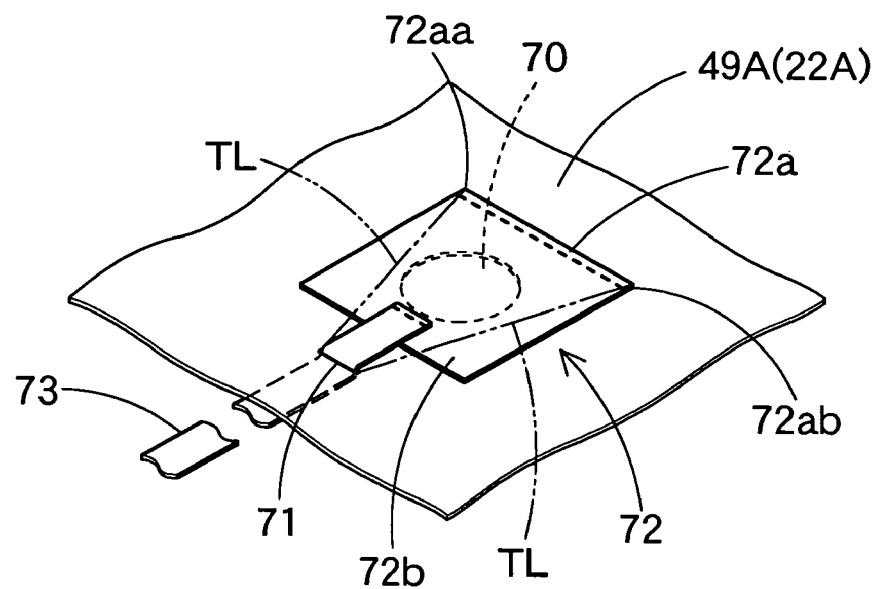
FIG. 15A is a partial enlarged perspective view of a vicinity of a communication hole of the airbag of FIG. 14A, illustrating the way the communication hole is closed.
Figure 15B:
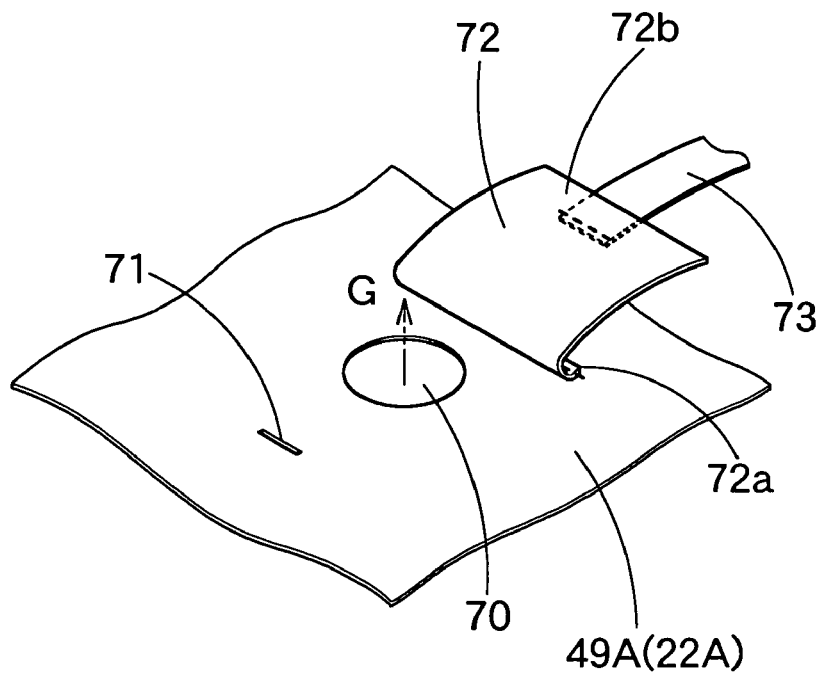
FIG. 15B is a partial enlarged perspective view of the vicinity of the communication hole of FIG. 15A, illustrating the way the communication hole is open.

Furthermore, the flap member 72 is joined to the periphery of the communication hole 70 by the circumferential edge 72a on the outer circumference of the bag body 22A, and the connecting element 73 extends from the leading end 72b facing away from the circumferential edge 72a. The connecting element 73 is inserted through the slit 71 into an interior of the bag body 22A for connection to the anchor mechanism 10. With this configuration, airbag inflation in small-volume mode generates tension forces TL on lines connecting opposite ends 72aa and 72ab of the circumferential edge 72a joined to the bag body 22A and the slit 71 as shown in FIG. 15A. The tension forces TL prevent the flap member 72 from floating up from the periphery of the communication hole 70 and assure closure of the communication hole 70. In the big-volume mode, the flap member 72 is pushed up by inflation gas G and accordingly the opening of the communication hole 70 is assured as well.

Although the foregoing embodiments have been described as applied to an airbag apparatus for a front passenger's seat, application of the present invention should not be limited thereby. The invention may be applied to an airbag apparatus mounted on a steering wheel. Moreover, although the supplementary bag 39/39A of the foregoing embodiments are located on a rear area of the bag body 22/22A that is expected to receive a passenger or a driver, the location of the supplementary bag should not be limited thereby. It will also be appreciated to locate the supplementary bag on a top face of the bag body or between the bag body and vehicle body structure such as a dashboard or steering wheel such that the supplementary bag abuts on the vehicle body structure and supports the bag body at airbag deployment.

What is claimed is:
1. An airbag apparatus comprising:
   a housing;
   an airbag folded up and housed in the housing for inflation by inflation gas, the airbag having flexibility and comprising:
      a bag body;
      a supplementary bag;
      a communication hole that communicates between the bag body and the supplementary bag;
      an open/close element that opens and closes the communication hole; and
      a connecting element extending from the open/close element and having flexibility; and
   an anchor mechanism that anchors a leading end of the connecting element in a releasable manner and regulates the operation of the open/close element under control of a control device that determines a desirable inflation mode of the airbag, wherein the open/close element keeps closing the communication hole while the anchor mechanism keeps holding the connecting element and opens the communication hole when the anchor mechanism releases the connecting element such that inflation gas is fed into the supplementary bag.

2. The airbag apparatus of claim 1, wherein:

the open/close element is a flap member comprised of a flexible sheet member and sized to close off the communication hole;

the flap member is joined to a peripheral area of the communication hole by at least a portion of a circumferential edge of the flap member on an outer circumference of the bag body;

the connecting element extends from a leading end of the flap member facing away from the portion of the circumferential edge of the flap member joined to the bag body; and the airbag further includes an insert hole that introduces the connecting element into an interior of the bag body for connection to the anchor mechanism.

3. The airbag apparatus of claim 2, wherein:

the airbag has a generally square conical contour at full inflation whose front end is the top of the square conical contour such that the airbag apparatus is suitable in use for installation on a top face of an instrument panel in front of a front passenger's seat and the airbag is deployable rearward between the top face of the instrument panel and a windshield, the airbag further comprising:

a gas inlet port for introducing inflation gas, at a generally center in a left and right direction of a front end of a lower side of the airbag at full inflation;

a recessed area that recesses forward and extends generally vertically at the center in a left and right direction at least on a rear area of the bag body at airbag inflation; and two raised regions located on the left and right of the recessed area and extending generally vertically, the raised regions being raised relative to the recessed area; and the supplementary bag is located on the rear area of the bag body so as to fill up the recessed area between the raised regions at opening of the communication hole.

4. The airbag apparatus of claim 3, wherein:

the anchor mechanism is located proximate the housing; and the connecting element is configured to extend generally along a deployment direction of the airbag when the airbag inflates with the connecting element anchored by the anchor mechanism.

5. The airbag apparatus of claim 1, wherein:

the bag body is formed by joining a plurality of base cloths together;

two adjoining cloths out of the base cloths each includes an extended portion that constitutes the open/close element in combination, the extended portions being formed by extending part of a circumferential edge of each of the cloths toward an interior of the bag body;

the two adjoining cloths are coupled together by the circumferential edges but have an uncoupled portion at root regions of the extended portions, and the uncoupled portion constitutes the communication hole; and the connecting elements are connected to leading ends of the extended portions and extend across the interior of the bag body to be anchored by the anchor mechanism.

6. The airbag apparatus of claim 5, wherein:

the airbag has a generally square conical contour at full inflation whose front end is the top of the square conical contour such that the airbag apparatus is suitable in use for installation on a top face of an instrument panel in front of a front passenger's seat and the airbag is deployable rearward between the top face of the instrument panel and a windshield, the airbag further comprising:

a gas inlet port for introducing inflation gas, at a generally center in a left and right direction of a front end of a lower side of the airbag at full inflation;

a recessed area that recesses forward and extends generally vertically at the center in a left and right direction at least on a rear area of the bag body at airbag inflation; and two raised regions located on the left and right of the recessed area and extending generally vertically, the raised regions being raised relative to the recessed area; and the supplementary bag is located on the rear area of the bag body so as to fill up the recessed area between the raised regions at opening of the communication hole.

7. The airbag apparatus of claim 6, wherein the communication hole is formed at a bottom of the recessed area.

8. The airbag apparatus of claim 6, wherein:

the anchor mechanism is located proximate the housing; and the connecting element is configured to extend generally along a deployment direction of the airbag when the airbag inflates with the connecting element anchored by the anchor mechanism.

* * * * *